(12) United States Patent
Niday et al.

(10) Patent No.: US 12,501,860 B2
(45) Date of Patent: Dec. 23, 2025

(54) AUTONOMOUS NAVIGATION IN AN ORCHARD FOR HARVESTING

(71) Applicant: Bonsai Robotics Inc., Santa Cruz, CA (US)

(72) Inventors: Tyler Niday, Santa Cruz, CA (US); Ugur Oezdemir, Danville, CA (US); Maciej Piotr Trzeciak, San Jose, CA (US); Rachit Aggarwal, San Jose, CA (US); Henry Fuller, Scotts Valley, CA (US); Kunal Saluja, Morgan Hill, CA (US)

(73) Assignee: Bonsai Robotics Inc., San Jose, CA (US)

( * ) Notice: Subject to any disclaimer, the term of this patent is extended or adjusted under 35 U.S.C. 154(b) by 90 days.

(21) Appl. No.: 18/612,940

(22) Filed: Mar. 21, 2024

(65) Prior Publication Data

US 2025/0295072 A1    Sep. 25, 2025

(51) Int. Cl.
| | |
|---|---|
| G05D 1/24 | (2024.01) |
| A01D 46/26 | (2006.01) |
| G05D 1/243 | (2024.01) |
| G05D 1/648 | (2024.01) |
| G05D 105/15 | (2024.01) |

(52) U.S. Cl.
CPC ............. *A01D 46/26* (2013.01); *G05D 1/243* (2024.01); *G05D 1/648* (2024.01); *G05D 2105/15* (2024.01)

(58) Field of Classification Search
CPC ........ A01D 46/26; G05D 1/648; G05D 1/243; G05D 2105/15
See application file for complete search history.

(56) References Cited

U.S. PATENT DOCUMENTS

| | | |
|---|---|---|
| 11,551,407 B1 | 1/2023 | Stanney et al. |
| 2014/0126769 A1 | 5/2014 | Reitmayr et al. |
| 2019/0221033 A1 | 7/2019 | Messerlie et al. |

FOREIGN PATENT DOCUMENTS

| | | |
|---|---|---|
| JP | 5494183 B2 | 5/2014 |

OTHER PUBLICATIONS

PCT Invitation to Pay Additional Fees, PCT Application No. PCT/US2025/019410, May 21, 2025, three pages.
PCT International Search Report and Written Opinion, PCT Application No. PCT/US2025/019410, Jul. 16, 2025, 18 pages.

*Primary Examiner* — Mathew Franklin Gordon
(74) *Attorney, Agent, or Firm* — Fenwick & West LLP

(57) ABSTRACT

An autonomous harvesting machine for orchard operating environments is described. The autonomous harvesting machine uses machine vision techniques to identify and triangulate features in the operating environment using a stream of monocular images. For instance, the harvesting machine identifies and localizes a shake point of a tree by projecting virtual rays from the pose of the identification system to the identified emergence point feature. To harvest the fruit of trees in the orchard, the harvesting machine shakes the tree at the identified shake point. Additionally, the harvesting machine autonomously navigates through the orchard using a combination high resolution spatial information based on localized features and low resolution spatial information from accessed satellite images.

20 Claims, 15 Drawing Sheets

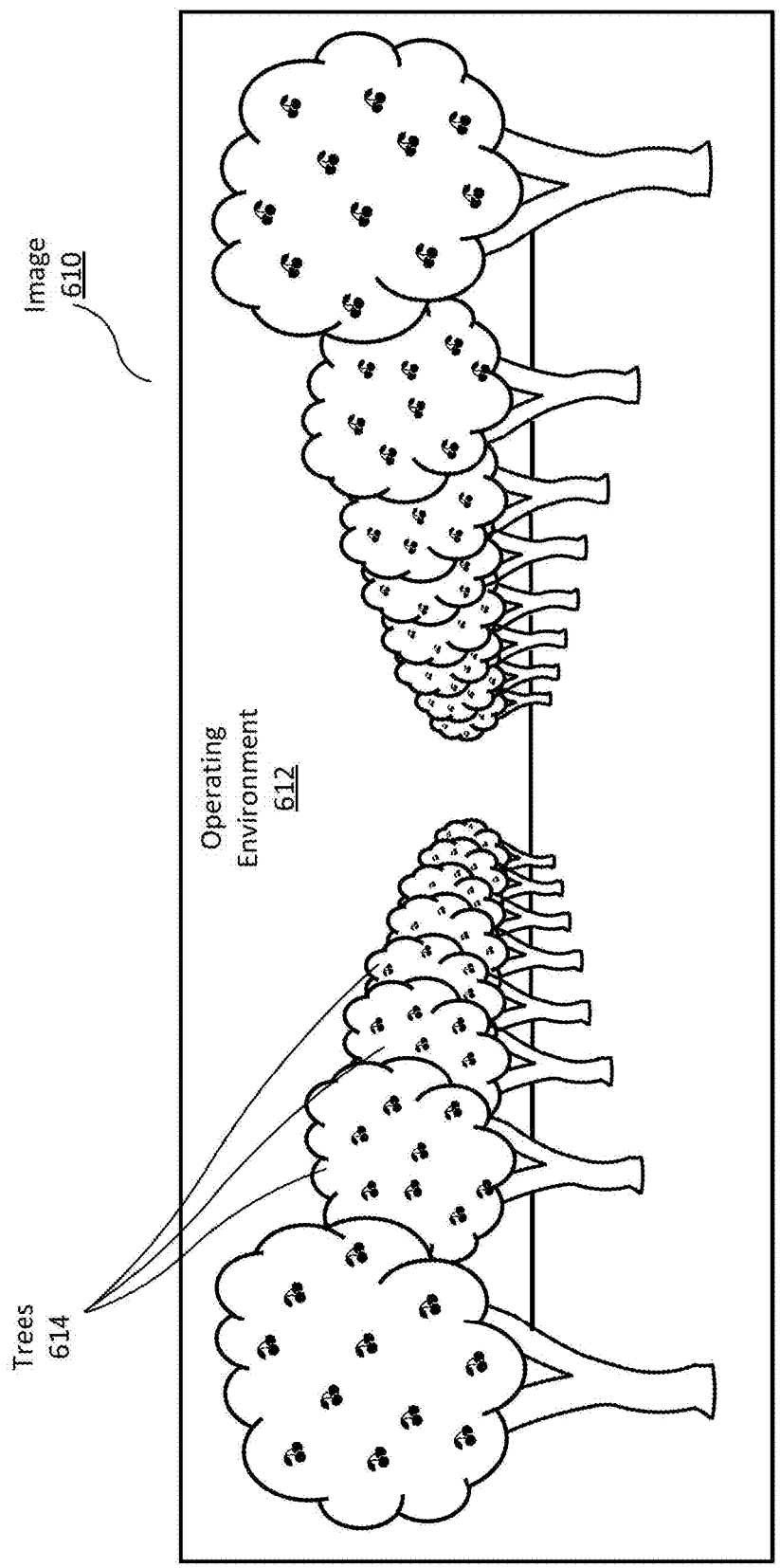

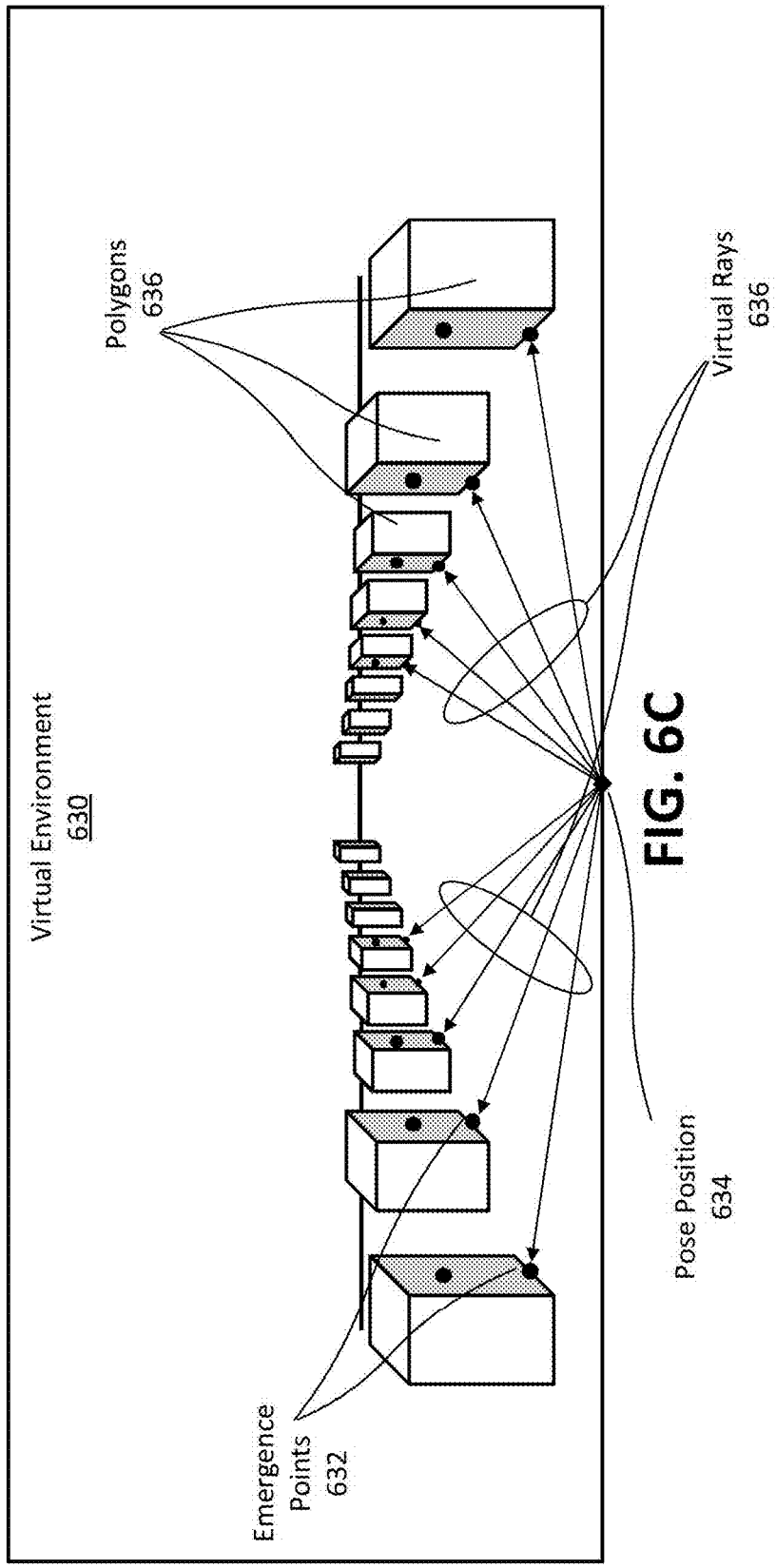

AUTONOMOUS NAVIGATION IN AN ORCHARD FOR HARVESTING

BACKGROUND

Field of Disclosure

This disclosure relates to autonomously harvesting fruit from trees in an orchard, and, more particularly, to determining a route through an orchard, localizing features in the orchard, and autonomously shaking trees in the orchard.

Description of Related Art

Historically, orchard harvesting, particularly the use of tree shakers, was characterized by a reliance on manual labor and basic mechanical equipment. These early human-operated models were designed to maximize yield but lacked the sophistication needed to minimize damage to trees and fruits. This resulted in less efficient harvesting and the need for extensive post-harvest processing. Despite significant advancements in farming automation in other agricultural sectors, these innovations have not fully extended to orchard harvesting for several reasons. Orchards pose unique challenges, such as irregular tree spacing, varying tree sizes, complex canopy structures, low connectivity, dusty operating environments, more structurally robust automation targets (tree trunks), the necessity for delicate fruit handling, etc., all of which have impeded the integration of more advanced automation technologies.

To address the unique challenges of orchard environments, specialized, technically advanced solutions are required. For example, systems and methods that adapt to low connectivity environments and are resilient to high levels of dust and debris would be beneficial for maintaining functionality in orchards. Additionally, the precision required for effective fruit harvesting demands sophisticated sensing and decision-making capabilities, a departure from general agricultural automation approaches which can be less precise. As such, the development of an autonomous harvester that encapsulates these capabilities would prove highly beneficial for orchard harvesting.

SUMMARY

In some aspects, the techniques described herein relate to a method including: accessing a low-fidelity image of an orchard including one or more tree rows; localizing, using the low-fidelity image, a position of an autonomous agricultural machine in a tree row of the one or more tree rows in the orchard; capturing, using the autonomous agricultural machine, high-resolution spatial information of one or more trees in the tree row; determining, for each tree in the tree row, an emergence point and a shake point of the tree using the high-resolution spatial information; determining, for each tree in the tree row, a corresponding minimum distance and maximum distance from the tree based on the emergence point and the shake point for the tree; and autonomously navigating the autonomous agricultural machine such that the autonomous agricultural machine moves along the tree row between the minimum distance and the maximum distance for each tree in the tree row.

In some aspects, the techniques described herein relate to a method, wherein the low-fidelity image is a satellite image captured of the orchard.

In some aspects, the techniques described herein relate to a method, wherein capturing high-resolution spatial information of one or more trees in the tree row includes triangulating positions of features in the orchard using a stream of monocular images of the orchard captured by the autonomous agricultural machine.

In some aspects, the techniques described herein relate to a method, further including: generating an initial route through the orchard using the low-fidelity image; and modifying the initial route to a modified route using the high-resolution spatial information.

In some aspects, the techniques described herein relate to a method, wherein the modified route is configured to allow the autonomous agricultural machine to move along the tree row between the minimum distance and the maximum distance for each tree in the tree row.

In some aspects, the techniques described herein relate to a method, wherein a position of the emergence point and the shake point of each tree is determined in a local reference frame of the autonomous agricultural machine.

In some aspects, the techniques described herein relate to a method, wherein the position of the emergence point and the shake point of each tree is updated using a global reference frame when the autonomous agricultural machine accesses the global reference frame.

In some aspects, the techniques described herein relate to a method, further including optimizing a path along the tree row to reduce a lateral movement of the autonomous agricultural machine.

In some aspects, the techniques described herein relate to a non-transitory computer-readable storage medium storing computer program instructions, the computer program instructions, when executed by one or more processors, causing the one or more processors to: access a low-fidelity image of an orchard including one or more tree rows; localize, using the low-fidelity image, a position of an autonomous agricultural machine in a tree row of the one or more tree rows in the orchard; capture, using the autonomous agricultural machine, high-resolution spatial information of one or more trees in the tree row; determine, for each tree in the tree row, an emergence point and a shake point of the tree using the high-resolution spatial information; determine, for each tree in the tree row, a corresponding minimum distance and maximum distance from the tree based on the emergence point and the shake point for the tree; and autonomously navigate the autonomous agricultural machine such that the autonomous agricultural machine moves along the tree row between the minimum distance and the maximum distance for each tree in the tree row.

In some aspects, the techniques described herein relate to a non-transitory computer-readable storage medium, wherein the low-fidelity image is a satellite image captured of the orchard.

In some aspects, the techniques described herein relate to a non-transitory computer-readable storage medium, wherein capturing high-resolution spatial information of one or more trees in the tree row further causes the computer program instructions, when executed by the one or more processors, to triangulate positions of features in the orchard using a stream of monocular images of the orchard captured by the autonomous agricultural machine.

In some aspects, the techniques described herein relate to a non-transitory computer-readable storage medium, wherein the computer program instructions, when executed, cause the one or more processors to: generate an initial route through the orchard using the low-fidelity image; and modify the initial route to a modified route using the high-resolution spatial information.

In some aspects, the techniques described herein relate to a non-transitory computer-readable storage medium, wherein the modified route is configured to allow the autonomous agricultural machine to move along the tree row between the minimum distance and the maximum distance for each tree in the tree row.

In some aspects, the techniques described herein relate to a non-transitory computer-readable storage medium, wherein a position of the emergence point and the shake point of each tree is determined in a local reference frame of the autonomous agricultural machine.

In some aspects, the techniques described herein relate to a non-transitory computer-readable storage medium, wherein the position of the emergence point and the shake point of each tree is updated using a global reference frame when the autonomous agricultural machine accesses the global reference frame.

In some aspects, the techniques described herein relate to a non-transitory computer-readable storage medium, wherein the computer program instructions, when executed, cause the one or more processors to optimize a path along the tree row to reduce a lateral movement of the autonomous agricultural machine.

In some aspects, the techniques described herein relate to an autonomous agricultural machine including: an identification system configured to capture high-resolution spatial information of one or more trees in tree rows; a chassis including one or more transport systems; and a control system including one or more processors, the one or more processors configured to execute computer program instructions that, when executed by the one or more processors, cause the control system to: access a low-fidelity image of an orchard including one or more tree rows; localize, using the low-fidelity image, a position of an autonomous agricultural machine in a tree row of the one or more tree rows in the orchard; capture, using the identification system of the autonomous agricultural machine, high-resolution spatial information of one or more trees in the tree row; determine, for each tree in the tree row, an emergence point and a shake point of the tree using the high-resolution spatial information; determine, for each tree in the tree row, a corresponding minimum distance and maximum distance from the tree based on the emergence point and the shake point for the tree; and autonomously navigate the autonomous agricultural machine, using the one or more transport systems, such that the autonomous agricultural machine moves along the tree row between the minimum distance and the maximum distance for each tree in the tree row.

In some aspects, the techniques described herein relate to an autonomous agricultural machine, wherein the low-fidelity image is a satellite image captured of the orchard.

In some aspects, the techniques described herein relate to an autonomous agricultural machine, wherein capturing high-resolution spatial information of one or more trees in the tree row further causes the computer program instructions, when executed by the one or more processors, to triangulate positions of features in the orchard using a stream of monocular images of the orchard captured by the autonomous agricultural machine.

In some aspects, the techniques described herein relate to an autonomous agricultural machine, wherein the computer program instructions, when executed, cause the one or more processors to: generate an initial route through the orchard using the low-fidelity image; and modify the initial route to a modified route using the high-resolution spatial information.

BRIEF DESCRIPTION OF DRAWINGS

FIGS. 6A-6F provides an illustration of the feature localization module determining the position of the features in the operating environment

DETAILED DESCRIPTION

I. Introduction

Figure 1:
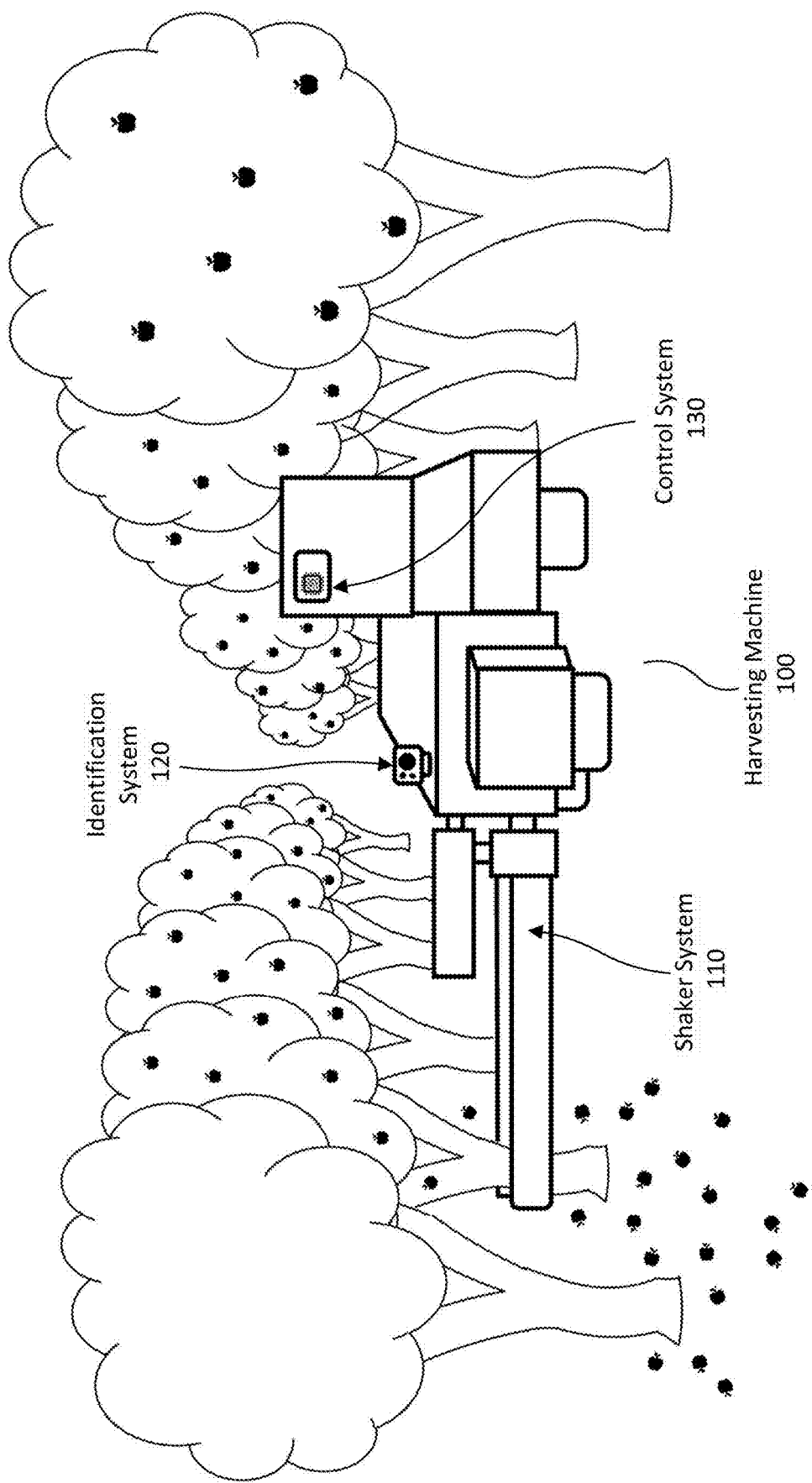
FIG. 1 is a front-side view of a fully autonomous harvesting machine that performs harvesting actions from a harvesting plan, according to an example embodiment.

In the past, tree shakers and other permanent tree crop harvesting technologies (e.g., orchard harvesting technologies) were markedly different from today's landscape. During previous eras, the primary approach to orchard harvesting relied heavily on manual labor supplemented by rudimentary mechanical equipment. Tree shakers and other harvesting machines of that period were predominantly mechanical in operation, characterized by their reliance on hydraulic systems and power-take-off driven mechanisms. These previous devices, while effective for their time, offered limited flexibility and efficiency. The designs predominantly focused on maximizing the yield from various tree types, with lesser emphasis on minimizing tree or fruit damage. Additionally, the lack of sophisticated sensing technology meant that operations were less precise, often resulting in suboptimal harvesting outcomes and increased labor for post-harvest sorting and processing.

In the more recent past, the landscape of farming automation has evolved significantly, particularly in open-field environments. However, this wave of innovation has not fully extended to tree shaking and orchard harvesting, or, more generally, orchard operations, due to the unique challenges inherent to these environments. In particular, orchards present a distinct set of technical difficulties not typically encountered in open-field farming. The irregular spacing of trees, varying tree sizes, the three-dimensional nature of the canopy, reduced connectivity in heavily treed areas, increased dust and debris from shaking and vibration, and the delicate handling required for fruit harvesting have all posed substantial barriers to the application of automation technologies. Furthermore, the complexity of navigating through orchard rows with autonomous or semi-autonomous machinery adds an additional layer of technical intricacy because trees have the potential to severely damage automated equipment, while the typical crop in a field does not. As a result, orchard harvesting and navigation has largely remained reliant on traditional, labor-intensive methods, with only incremental improvements in mechanical shakers, sweepers, and harvesters.

Addressing these challenges necessitates the development of specialized, technical solutions tailored to the unique requirements of orchard environments. Key among these is the adaptation to low connectivity environments, where standard communication protocols applicable and usable in broader agricultural automation may be less effective. Additionally, orchard operations must contend with high levels of dust and debris, factors that can significantly impair the functionality of sensitive electronic components and sensors. Developing robust systems capable of operating reliably in such conditions is critical. Furthermore, the precision required for effective fruit harvesting demands advanced sensing, precise localization, and decision-making capabilities to ensure minimal damage to both the produce and the trees. The integration of these considerations into the design of orchard harvesting equipment represents a substantial departure from the more generalized approaches applied in other areas of agricultural automation.

In light of these considerations, the development of an autonomous harvester, and, more generally, autonomous harvesting equipment (e.g., shakers, sweepers, conditioners, pickup machines, shuttles, etc.), that encapsulates these unique capabilities presents a significant opportunity. Such a system would not only address the current inefficiencies and limitations of traditional orchard harvesting methods but also herald a new era of precision agriculture specifically tailored to orchard environments. An autonomous harvester, equipped with advanced sensory and navigational technology, could dramatically enhance harvesting efficiency, reduce labor dependency, and minimize fruit and tree damage. An automated harvester equipped with the appropriate mechanical and vision system would be capable of real-time adaptation to varying orchard conditions, operate in dust-laden conditions, and function effectively in low connectivity scenarios.

Disclosed herein is an automated harvester with mechanical and machine vision systems capable of harvesting fruit from trees in an orchard in a manner that addresses the problems set forth above.

II. Orchard Management

Harvesting managers ("managers") manage harvesting operations in one or more orchards. Managers implement a harvesting plan to accomplish a harvesting objective within those orchards and select from among a variety of harvesting actions to implement that harvesting plan.

Traditionally, managers are, for example, an orchardist or agronomist that works the orchard but could also be other people and/or systems configured to manage harvesting operations within the orchard. For example, a manager could be an automated harvesting machine, a machine learned computer model, etc. In some cases, a manager may be a combination of the managers described above. For example, a manager may include an orchardist assisted by one or more machine-learned models and one or more automated harvesting machines.

Managers implement one or more harvesting objectives for an orchard. A harvesting objective is typically a macro-level goal for the orchard. For example, macro-level harvesting objectives may include harvesting fruits from a tree or any other suitable harvesting objective. However, harvesting objectives may also be a micro-level goal for the orchard. For example, micro-level harvesting objectives may include identifying a tree, selecting a harvesting position, adjusting speed and path to approach trees, applying vibrational energy to the tree to dislodge fruit from the canopy, and harvesting the dislodged fruit. Of course, there are many possible harvesting objectives and combinations of harvesting objectives, and the previously described examples are not intended to be limiting.

Harvesting objectives are accomplished by one or more harvesting machines performing a series of harvesting actions. Harvesting machines are described in greater detail below. Harvesting actions are any operation implementable by a harvesting machine within the orchard that works towards a harvesting objective. Consider, for example, a harvesting objective of harvesting fruit from an orchard in a manner that optimizes harvesting time. This harvesting objective requires a litany of harvesting actions, e.g., identifying trees, navigating, generating routes, etc. Similarly, each harvesting action pertaining to harvesting the orchard may be a harvesting objective in and of itself and may have its own constituent set of harvesting actions.

With this context, managers implement a harvesting plan to accomplish a harvesting objective in an orchard. In effect, the harvesting plan is a hierarchical set of macro-level and/or micro-level objectives that accomplish the harvesting objective of the manager. Within a harvesting plan, each macro or micro-objective may require a set of harvesting actions to accomplish, or each macro or micro-objective may be a harvesting action itself. So, to expand, the harvesting plan is a temporally sequenced set of harvesting actions to apply to the orchard to accomplish the harvesting objective.

In various contexts, the manager can control various aspects of the harvesting plan. For example, the manager can change the objective, modify objectives, etc., of an autonomous harvesting machine implementing the harvesting plan. To do so, the manager may connect to the harvesting machine with a device and, e.g., define its objectives and modify its actions. Similarly, the autonomous harvesting machine may request instructions from a manager by connecting to the manager's client device and making a query. Whatever the case, the systems and methods disclosed herein allow for a manager to define, control, and interact with an autonomous harvesting machine such that the harvesting machine can implement a harvesting plan to accomplish the manager's harvesting objective.

III. Fruit Harvesting Machine

Overview

A fully autonomous or semi-autonomous harvesting machine implements harvesting actions of a harvesting plan and may have a variety of configurations, some of which are described in greater detail below.

FIG. 1 is a front-side view of a fully autonomous harvesting machine that performs harvesting actions from a harvesting plan, according to an example embodiment.

The harvesting machine 100 includes a detection system 110, a shaker system, 120, and a control system 130. The harvesting machine 100 can additionally include a collector mechanism, a communication system, a verification system, a vibration control system 130, a harvesting system, a power source, digital memory, sensors, or any other suitable component that enables the harvesting machine 100 to implement harvesting actions in a harvesting plan. Moreover, the described components and functions of the harvesting machine 100 are just examples, and the harvesting machine 100 can have additional or different components and functions other than those described hereinbelow.

The harvesting machine 100 is configured to perform harvesting actions in an operating environment (e.g., an orchard), and the implemented harvesting actions are part of a harvesting plan for that orchard. The harvesting plan may be implemented by a manager of that orchard. To illustrate, the harvesting machine 100 implements a harvesting action when it shakes a tree in the orchard, and/or implements a harvesting action when it collects the fruits that are shaken from the tree. In this example, the harvesting actions are included in a harvesting plan to autonomously harvest fruits from trees in an orchard, and, as such, the various harvesting actions are typically applied to individual trees in the orchard.

Notably, harvesting actions in a harvesting plan can additionally include determining a route or path for a harvesting machine 100 in an orchard, localizing features in the orchard, localizing the harvesting machine 100 in the orchard, identifying trees in the orchard, identifying harvesting positions for trees in the orchard, navigating between trees in the orchard, collecting fruits and nuts in the orchard, etc. In other words, the various harvesting actions are implemented as a harvesting plan to accomplish a harvesting objective of a manager.

Operating Environment

Figure 2:
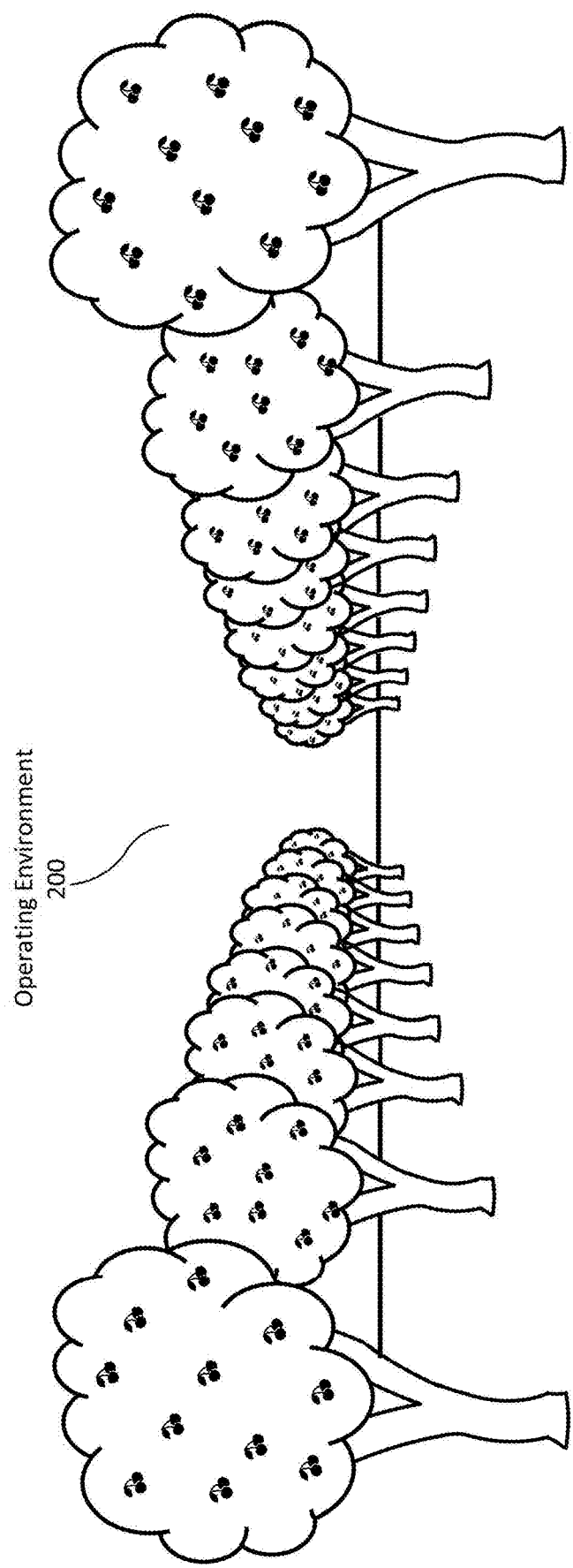
FIG. 2 illustrates an operating environment of a harvesting machine, according to an example embodiment.

The harvesting machine 100 operates in an operating environment. FIG. 2 illustrates an operating environment, according to an example embodiment. The operating environment 200 is the environment surrounding the harvesting machine 100 while it implements harvesting actions of a harvesting plan (e.g., an orchard). Depending on the configuration, the operating environment 200 may also include the harvesting machine 100 and its corresponding components itself.

The operating environment 200 typically includes an array of harvestable trees 210 (or "tree array", or "orchard"), and the harvesting machine 100 generally implements harvesting actions of the harvesting plan in the tree array. A tree array, more simply, is a geographic area where the harvesting machine 100 implements a harvesting plan. A tree array may be an outdoor tree array such as, for example, an orchard, a grove, a copse, or another suitable outdoor operating environment. The tree array may also be an indoor tree array such as, for example, one found in a greenhouse, a laboratory, a grow house, or another suitable indoor operating environment.

Trees in a tree array typically adhere to an ordered pattern. For instance, the trees may be planted in a straight line, and every tree may planted, e.g., every five feet along the straight line. Similarly, lines of trees in a tree array may be planted parallel to one another. Each parallel line of trees may be separated by the same distance (e.g., five feet) or by different distances (e.g., five feet, six feet, seven feet, etc.). Of course, trees in a tree array may not perfectly adhere to an ordered pattern. For instance, one or more of the trees may be incorrectly spaced relative to their neighbors, and/or one or more of the trees could be missing, and/or one or more trees may grow in a manner that breaks the order of the tree array. In these instances, the harvesting machine 100 may take various harvesting actions to account for trees that do not adhere to the ordered pattern.

A tree array may include any number of tree array portions. A tree array portion is a subunit of a tree array. For example, a tree array portion may be small enough to include a single tree, large enough to include many trees, or some other size. The harvesting machine 100 can execute different harvesting actions for different tree array portions. For example, the harvesting machine 100 may harvest a first type of fruit in a first tree array portion, while harvesting a second type of fruit in a second tree array portion. A tree array and a tree array portion are largely interchangeable in the context of the methods and systems described herein. That is, harvesting plans and their corresponding harvesting actions may be applied to an entire tree array or a tree array portion depending on the circumstances at play.

The operating environment 200, therefore, typically includes trees arranged in a tree array, which may (or may not) be divided into tree array portions. The trees may be fruit trees such as apple, orange, lemon, lime, peach, etc. The trees may also be nut trees such as cashew, pistachio, walnut, almond, pecan, grape, olive, etc. As the harvesting actions the harvesting machine 100 implements as part of a harvesting plan may be applied to trees in the tree array to harvest from the trees, the harvesting machine 100 may be used to harvest apples, oranges, lemons, limes, peaches, cashews, pistachios, walnuts, almonds, pecans, etc.

To provide additional context for the disclosure, trees in the operating environment 200 generally include a root structure, a trunk, one or more branches, one or more leaves, and one or more fruits. The root structure constitutes an underground system (e.g., underneath the substrate) comprising primary roots, secondary roots, and root hairs. The root structure functions as an anchor for the tree, offering stability, nutrients, and water absorption from the surrounding soil layers through a vast network of fine hair-like structures. The trunk is the central wooden axis of the tree, typically coated in bark, which functions as a structural scaffold offering vertical support for the tree, housing the layer of vascular tissue responsible for nutrient and water transport. Branches are outgrowths of the trunk, forming a complex network that extends outwards, providing additional stability, functioning as a support structure for leaves, flowers, and fruit, and serving as conduits for water and nutrient transport. Leaves are the principal photosynthetic organs of a tree. Leaves are typically a thin, flat structure that captures sunlight and carbon dioxide to synthesize food via the process of photosynthesis. Fruits (and nuts) are mature ovaries of flowering trees, encompassing the seeds. The fruits facilitate the process of seed dispersal, allowing for the propagation and future growth of the species. Fruits (and nuts) may be harvestable for human consumption.

The operating environment 200 may also include a substrate. As such, harvesting actions the harvesting machine 100 implements as part of a harvesting plan may be applied to the substrate. The substrate is typically the soil in which a tree is planted but could be another suitable substrate. The substrate generally includes the root structure of each tree, and the trunk of the tree emerges from the tree. Additionally, some of the substrate in the operating environment 200 may not include a tree or portion of a tree (e.g., areas of substrate between trees in a tree array).

III.A Example Machine Configurations

Identification System(s)

The harvesting machine 100 includes an identification system 120. The identification system 120 identifies objects and features in the operating environment 200 of the harvesting machine 100. To do so, the identification system 120 obtains information describing the operating environment 200 (e.g., sensor or image data), and processes that information to identify pertinent objects and features (e.g., trees, tree parts, substrate, etc.) in the operating environment 200. Identifying objects and features in the operating environment 200 further enables the harvesting machine 100 to implement harvesting actions in the operating environment 200. For example, the identification system 120 may capture an image or video of a tree array, and process the image to identify trees, or portions of trees, in the captured image or video. The harvesting machine 100 then implements harvesting actions in a tree array based on the trees identified in the image.

The identification system 120 may include any number of sensors that may aid in determining and implementing harvesting actions in a tree array. The sensors may be one or more imaging systems configured for capturing images of the operating environment 200. For example, sensors in the identification system 120 may be an imaging system such as a standard RGB camera, a multispectral camera, a stereo camera, an IR camera, a thermal camera, etc. Similarly, the sensors may be one or more proximity sensing systems configured for capturing information about the operating environment 200 surrounding the harvesting machine 100. For example, the sensors in the identification system 120 may include a LIDAR system, a depth-sensing system, etc. In an example configuration, the identification system is a single RGB sensor capturing a series of single images of the operating environment 200 (e.g., "monocular images" in a "stream" of monocular images). as the harvesting machine 100 travels through that operating environment 200.

More generally, the identification system 120 may include any type of sensor that may aid in obtaining information about the operating environment 200 such that the harvesting machine 100 can determine and implement harvesting actions. For example, the sensors in the identification system 120 may include a microphone, a humidity sensor, a thermometer, or any other suitable sensor.

The identification system 120 may also include one or more sensors configured to measure the state of the harvesting machine 100. For example, the identification system 120 may include a speed sensor, a heat sensor, a wheel angle sensor, an inertial measurement unit, a GPS unit, or some other sensor that can monitor the state of a component of the harvesting machine 100. Additionally, the identification system 120 may also include a sensor that measures components during the implementation of a harvesting action. For example, the identification system 120 may be a hydraulic pressure monitor, a gyroscope, an inertial measurement unit, a pressure sensor, etc. Whatever the case, the identification system 120 senses information about the operating environment 200 (including the harvesting machine 100).

Sensors of the identification system 120 may form a sensor array configured to capture information about the operating environment 200 surrounding the harvesting machine 100 (and the harvesting machine 100 itself). The identification system 120 may include one, two, three, five, ten, twenty, or more sensors. For example, the identification system 120 may include an array of cameras configured to capture pictures or video representing the operating environment 200 surrounding the harvesting machine 100. The pictures or videos may be obtained from the same or different viewpoints, and each of the pictures or videos may be used to identify similar or different objects and/or features depending on the configuration of the harvesting machine 100. For instance, one picture or video may be used to identify trees, while another picture or video is used to identify the proximity between the harvesting machine 100 and objects in the operating environment 200.

An identification system 120, or sensors of the identification system 120, may be mounted at any point on the structure of the harvesting machine 100. Generally, however, the identification system 120 is positioned such that it can measure the operating environment 200 surrounding the harvesting machine 100 and correctly implement harvesting actions of a harvesting plan. The identification system 120 may be statically mounted to the harvesting machine 100 or may be removably or dynamically coupled to the harvesting machine 100. In this manner, the identification system 120 of the harvesting machine 100 may be integrated into the harvesting machine 100 itself or may be added to the harvesting machine 100.

Verification System(s)

The harvesting machine 100 may include a verification system. Generally, the verification system records or measures some aspect of the operating environment 200 and the harvesting machine 100 may use the information to verify or determine the extent of an implemented harvesting action (i.e., a result of the harvesting action).

To illustrate, consider an example where a harvesting machine 100 implements a harvesting action (e.g., shaking a tree) based on a measurement of the operating environment 200 by the identification system 120 (e.g., identifying a point on a tree trunk in an image). The verification system records a measurement of the same area measured by the identification system 120 where harvesting machine 100 implemented the harvesting action. The harvesting machine 100 then processes the recorded measurement to determine the result of the harvesting action. For example, the verification system may record an image the operating environment 200 after the harvesting machine 100 shakes a tree. The harvesting machine 100 may apply a treatment detection algorithm to the recorded image (e.g., a feature identification model) to determine the result of the harvesting action applied to the tree (e.g., identifying dislodged fruits).

Like the identification system 120, the verification system can have various configurations. For example, the verification system can be substantially similar (e.g., be the same type of mechanism as) to the identification system 120 or can be different from the identification system 120. In some cases, the identification system 120 and the verification system may be the same (e.g., the same sensor). Additionally, like the identification system 120, the verification system can include any number or type of sensors.

Shaker System(s)

The harvesting machine 100 may include a shaker system 110. The shaker system 110 includes a clamp articulating system, a clamping assembly, and a vibration generation system. These elements, when acting together, articulate the clamping assembly to grip a tree trunk (or a point of the trunk, a major limb of a tree, etc.) and impart a controlled, vigorous shaking motion to the gripped tree. The shanking motion loosens produce from the branches causing it to fall towards or to the ground for harvesting by a harvesting system. The shaker system may include a clamping assembly large enough to grasp a tree trunk, or small enough to grasp the stem of a grape.

The clamp articulating system moves the clamping assembly. Generally, the clamp articulating system allows the clamping assembly to have multi-axis movement. In an embodiment, the clamp articulating system enables various degrees of freedom including, e.g., vertical lift, horizontal extension, and radial closure. The vertical lift may be created using a combination of hydraulic and pneumatic actuators. These mechanisms enable the clamping assembly to ascend or descend to the appropriate height for trees of differing stature. This allows the shaker system 110 to accommodate trees of varying heights and to align the clamping assembly with the desired point of contact on the tree trunk. The horizontal movement may be created using telescopic arms powered by hydraulic cylinders. These arms can extend or retract, providing the ability to reach out to trees at different distances from the path of the harvesting machine 100 or to pull back for transit between rows of trees. The radial closure may be created by a series of pneumatic actuators attached to the clamping arms. These actuators can rapidly inflate or deflate, allowing the arms to open and close around the tree trunk with a gentle yet firm pressure.

The clamping assembly grips the tree. The clamping assembly generally includes a first arm and a second arm that are actuatable to be positioned such that they can grip a tree from two sides. For example, a tree trunk extends upwards from the substrate. The first arm of the clamping assembly is positioned on the first side of the tree, and the second arm of the clamping assembly is positioned on the second side of the tree opposite the first side of the tree. The first and the second arm are actuated such that the first arm contacts the first side of the tree, and the second arm contacts the second side of the tree. The clamping assembly may be configured such that the pressure applied to the tree when gripped by the clamping mechanism is determined by a control system 130 of the harvesting machine 100. Additionally, the clamp articulating system can move the clamping assembly horizontally and vertically such that the contact point of the clamping assembly may be selected and implemented by a control system 130 of the harvesting machine 100.

The vibration generation system creates vibrational energy that is imparted to the tree through the clamping mechanism. The vibration generation system is configured to initiate a shaking motion. The shaking motion may be vertical and/or horizontal, depending on the configuration of the harvesting machine 100. In some configurations, the generated shaking motion is configured to simulate a natural wind-like disturbance that is effective in detaching produce from the tree. The control system 130 of the harvesting machine 100 can control and adjust the frequency and amplitude of the generated vibrations are fully adjustable. Thus, the harvesting machine 100 can generate vibrations that cater to the delicate nature of certain fruits to prevent bruising or damage during the harvest, and/or generate vibrations that cater to the particular types of tree (or tree itself) from which it is harvesting fruits.

The shaker system 110 may also include one or more sensors. The sensors may measure various aspects of the shaker system 110 such as, for example, the position of the clamping assembly, the movement of the clamping assembly, the state of various actuators in the clamp articulating system, the state of various actuators in the clamping assembly, the state of various actuators in the vibration generation system, characteristics of created vibrational energy (e.g., frequency, amplitude, etc.), etc.

Harvester System(s)

The harvesting machine 100 may include a harvester system that implements one or more harvesting actions in a harvesting plan. For example, the harvester system may harvest fruit in the operating environment 200 as the harvesting machine 100 implements the harvesting plan. In various configurations, the harvester system may harvest fruit when it is shaken from the tree by the shaker system 110, or after the fruit is shaken from the tree by the shaker system 110. The harvesting machine 100 may harvest the fruit on the same pass through the orchard or a subsequent pass through the orchard, depending on the configuration. The harvester system can harvest fruit in a variety of ways. For example, the harvester system may be a net, box, or slide that may be positioned under a tree such that when the shaker system 110 shakes the tree to release the fruit, the fruit falls into the net, box, or slide. In another example, the harvester system picks up fruit from the substrate after it has been released by the shaker system 110. In this case, the harvester system may include, e.g., a sweeping system, a net system, a shovel system, a vacuum system, etc. to pick up the fruit from the substrate. In whatever configuration, the harvester system may include one or more actuators configured to position the harvester system such that it may harvest the fruit (e.g., position the net beneath a tree, sweep fruit from the substrate), and one or more processing systems to identify fruit for harvesting (e.g., identify fruit on the substrate).

Storage System(s)

The harvesting machine 100 may include a storage system. The storage system stores fruits harvested by the harvester system. The storage system may include a series of conveyance mechanisms and storage units that are integrated into the harvesting machine 100 to facilitate the immediate collection and preservation of fruits post-harvest. The storage system reduces the time between fruit detachment and storage, which significantly reduces the likelihood of damage or spoilage. The storage system is configured for storing different types of fruits, varying in size, weight, and fragility, ensuring a versatile application across various orchard types. The storage system may include temperature control, ventilation, and cushioning to aid in fruit storage.

Transport System(s)

The harvesting machine 100 may include a transport system. The transport mechanisms of the transport system may include any number of wheels, continuous treads, articulating legs, or some other transport mechanism(s). Typically, the transport mechanisms are attached to a drive mechanism that causes the transport mechanisms to translate the harvesting machine 100 through the operating environment 200. For instance, the harvesting machine 100 may include a drive train for rotating treads. In different configurations, the harvesting machine 100 may include any other suitable number or combination of transport mechanisms and drive mechanisms.

The transport system is configured to be autonomously controlled by the control system 130. In this manner, the transport system is actuated to navigate the harvesting machine 100 through the operating environment as it performs harvesting actions. In some configurations, the control system 130 may direct the transport system to navigate to a storage station to offload harvested produce before continuing to harvest fruit from additional trees in the operating environment 200.

Conditioning System(s)

The harvesting machine 100 may include a conditioning (and/or or preconditioning) system. The conditioning system performs a set of preparatory harvesting actions prior to harvesting fruit from a tree using the shaker system. Specifically, the conditioning system applies farming actions to aid in increasing the cleanliness and purity of harvest nuts and/or fruit. For instance, the condition system eliminates external contaminants such as dirt, sticks, leaves, and other undesirable particles that might have adhered to the produce during or after its collection from the field. In some configurations, implementing farming actions of the conditioning system involves processes such as sifting, blowing, or washing. Sifting and blowing generally use the difference in size or weight between the produce and the contaminants. Larger and heavier fruits or nuts fall into a separate compartment, while lighter and smaller contaminants are blown away or left to pass through a mesh. In a washing-based conditioning system, the produce is subjected to a thorough rinse which dislodges the adhering contaminants and washes them away.

Control System(s)

The harvesting machine 100 includes a control system 130. The control system 130 identifies trees and generates instructions for harvesting fruit from those trees. To do so, the control system 130 controls the operation of the various components and systems on the harvesting machine 100. As a brief example, the control system 130 may obtain information about the operating environment 200 (e.g., an image of trees), process that information to identify a harvesting action to implement as part of a harvesting plan (e.g., identify a tree and harvesting position), and implement the identified harvesting action with system components of the harvesting machine 100 (e.g., navigate the harvesting machine to the harvesting position, shake the tree at the harvesting position, etc.).

The control system 130 can receive information from the identification system 120, the verification system, the shaker system 110, and/or any other component or system of the harvesting machine 100. For example, the control system 130 may receive images, video, or measurements from the identification system 120, information relating to the state of the harvesting machine 100 from the shaker system 110, or implemented harvesting actions from a verification system. Other information is also possible.

Similarly, the control system 130 can provide input to the identification system 120, the verification system, the shaker system 110, or any other system or component of the harvesting machine 100. For instance, the control system 130 may generate operational control parameters of the harvesting machine 100 as part of its autonomous function (e.g., speed, direction). Similarly, the control system 130 may generate operational and control parameters for the identification system 120 and/or verification system. Operational control parameters for the identification system 120 and/or verification system may include processing time, location and/or angle of the identification system 120, image capture intervals, image capture settings, sensor settings, measurement controls, etc. Other inputs are also possible. Further, the control system 130 may be configured to generate operational control parameters and inputs for the shaker system 110. That is, the control system 130 may translate a determined harvesting action of a harvesting plan into machine instructions (e.g., how to shake the tree) implementable by the shaker system 110.

The control system 130 can be operated in a variety of manners. For example, the control system 130 may be operated by a manager or user operating the harvesting machine 100, the control system 130 may be operated wholly autonomously or partially autonomously (e.g., with limited operator input), operated by a user or manager connected to the harvesting machine 100 by a network, or any combination of the above. To provide a brief example, the control system 130 may be operated by an agricultural manager sitting in a cabin of the harvesting machine 100, or the control system 130 may be operated by an agricultural manager connected to the control system 130 via a wireless network. In another example, the control system 130 may implement an array of control algorithms, machine vision algorithms, decision algorithms, etc. that allow it to operate wholly autonomously or partially autonomously.

The control system 130 may be implemented by a computer or a system of distributed computers. The computers may be connected in various network environments. For example, the control system 130 may be a series of computers implemented on the harvesting machine 100 and connected by a local area network. In another example, the control system 130 may be a series of computers implemented on the harvesting machine 100 and/or in the cloud. The series of computers may also include a computer operating as a client device of, e.g., the agricultural manager. In distributed configurations, one or more of the computers may be connected by a wireless area network.

The control system 130 can apply one or more computer models to determine and implement farming actions in the orchard. For example, the control system 130 can apply a feature identification module to images acquired by the identification system 120 to determine and implement harvesting actions. The control system 130 may be coupled to the harvesting machine 100 such that an operator (e.g., a wirelessly connected manager) can interact with the control system 130. In other embodiments, the control system 130 is physically removed from the harvesting machine 100 and communicates with system components (e.g., identification system 120, shaker system 110, etc.) wirelessly.

In some configurations, the harvesting machine 100 may additionally include a communication apparatus, which functions to communicate (e.g., send and/or receive) data between the control system 130 and one or more remote devices (e.g., a network system, another harvesting machine 100, a client device, remote sensors, etc.). The communication apparatus can be a Wi-Fi communication system, a cellular communication system, a short-range communication system (e.g., Bluetooth, NFC, etc.), or any other suitable communication system.

Other Machine Components

In various configurations, the harvesting machine 100 may include any number of additional components.

For instance, the harvesting machine 100 may include one or more coupling mechanisms. The coupling mechanisms allow one or more components to be coupled to, e.g., the chassis of the harvesting machine 100. Each coupling mechanism allows for one or more components of the harvesting machine 100 to be removably couplable from the harvesting machine 100. For example, one or more sensors of the identification system 120 may be removably couplable from the chassis of the harvesting machine 100 using a coupling mechanism.

The harvesting machine 100 may additionally include a power source, which functions to power the system components, including the identification system 120, control system 130, and shaker system 110. The power source can be mounted to the mounting mechanism 140, can be removably coupled to the mounting mechanism 140, or can be incorporated into another system component (e.g., located on the drive mechanism). The power source can be a rechargeable power source (e.g., a set of rechargeable batteries), an energy harvesting power source (e.g., a solar system), a fuel consuming power source (e.g., a set of fuel cells or an internal combustion system), or any other suitable power source. In other configurations, the power source can be incorporated into any other component of the harvesting machine 100.

The harvesting machine 100 may also include a pruning system, which functions to trim and maintain tree branches in a tree array. The pruning system may employ the identification system 120 and control system 130 to identify branches for pruning based on acquired image and/or sensor data. As an example, the identification system 120 may capture an image of a tree and identify a tree branch for pruning. The control system 130 may generate instructions for a machine arm to towards the branches and prune those branches from the tree. The control system may apply various machine-learning models to the image to identify branches for pruning. The machine-learned models may be configured to prune dead or superfluous branches or may prune branches in a manner to increase or optimize the growth of fruit in the future.

The harvesting machine 100 may include a hedging system, which functions to control and maintain the vertical growth and/or shape of the trees. The hedging system may employ the identification system 120 and control system 130 to identify branches (or other parts of the tree for hedging). As an example, the identification system 120 may capture an image of a tree and identify a portion of a tree for hedging. The control system 130 may generate instructions for a machine arm to articulate towards the tree and hedge the branches such that the tree has the appropriate shape. In turn, the harvesting machine 100 may be equipped with an array of sharp, powerful cutting blades to hedge the tree. The machine-learned models may be configured to hedge trees to maintain the appropriate shape for the tree shaker—not too tall, or too wide, but just right for the configuration of the tree shaker.

The harvesting system 100 may include a sprayer system, which functions to regulate growth, control pests, and fertilize the substrate as needed by applying moisture or treatments in the environment. The sprayer system may employ the identification system 120 and control system 130 to identify objects and areas in the operating environment 200 to spray with various treatments. As an example, the identification system 120 may capture an image of the operating environment and identify signs of a pest or disease on a tree, tree and identify a portion of a tree for hedging. The control system 130 may generate instructions for a sprayer of the harvesting machine 100 to spray the affected areas with a treatment. In turn, the harvesting machine 100 may be equipped with an of sprayers configured to apply spray treatments to objects in the operating environment 200. The machine-learned models may be configured to objects in the operating environment 200 for treatment with a sprayer to promote or regulate growth, control pests or diseases, etc.

The harvesting system 100 may include a spreader system, which functions to spread compost or other nutrients across the substrate in the operating environment. The spreading system may include of a large storage compartment for the compost material, a spreading device—e.g., a rotating, mechanical arm with diffusion capabilities—and a tracking mechanism to evenly distribute the compost. The spreading system may also employ the identification system 120 and control system 130 to identify areas of the substrate for fertilization and generating the appropriate instructions. The spreader system allows the harvesting machine 100 to ameliorate soil quality, promoting stronger tree growth and consequently better fruit yield.

The harvesting system 100 may include a mowing system, which functions to maintain the height of additional (non-tree) foliage in the operating environment 200. In other words, given that excess foliage on the substrate of the operating environment can prove detrimental to tree health and fruit production, the mowing system is designed to maintain ground-level vegetation at optimal heights. The mowing system includes a series of cutting blades, a motor to power these blades, and a control system for adjusting cutting height and speed. As the machine traverses the orchard, the mowing system effectively keeps the ground clean and conducive for maximum productivity. The mowing system may also employ the identification system 120 and control system 130 to identify areas of the substrate in the operating environment 200 for mowing.

III.B System Environment

Figure 3:
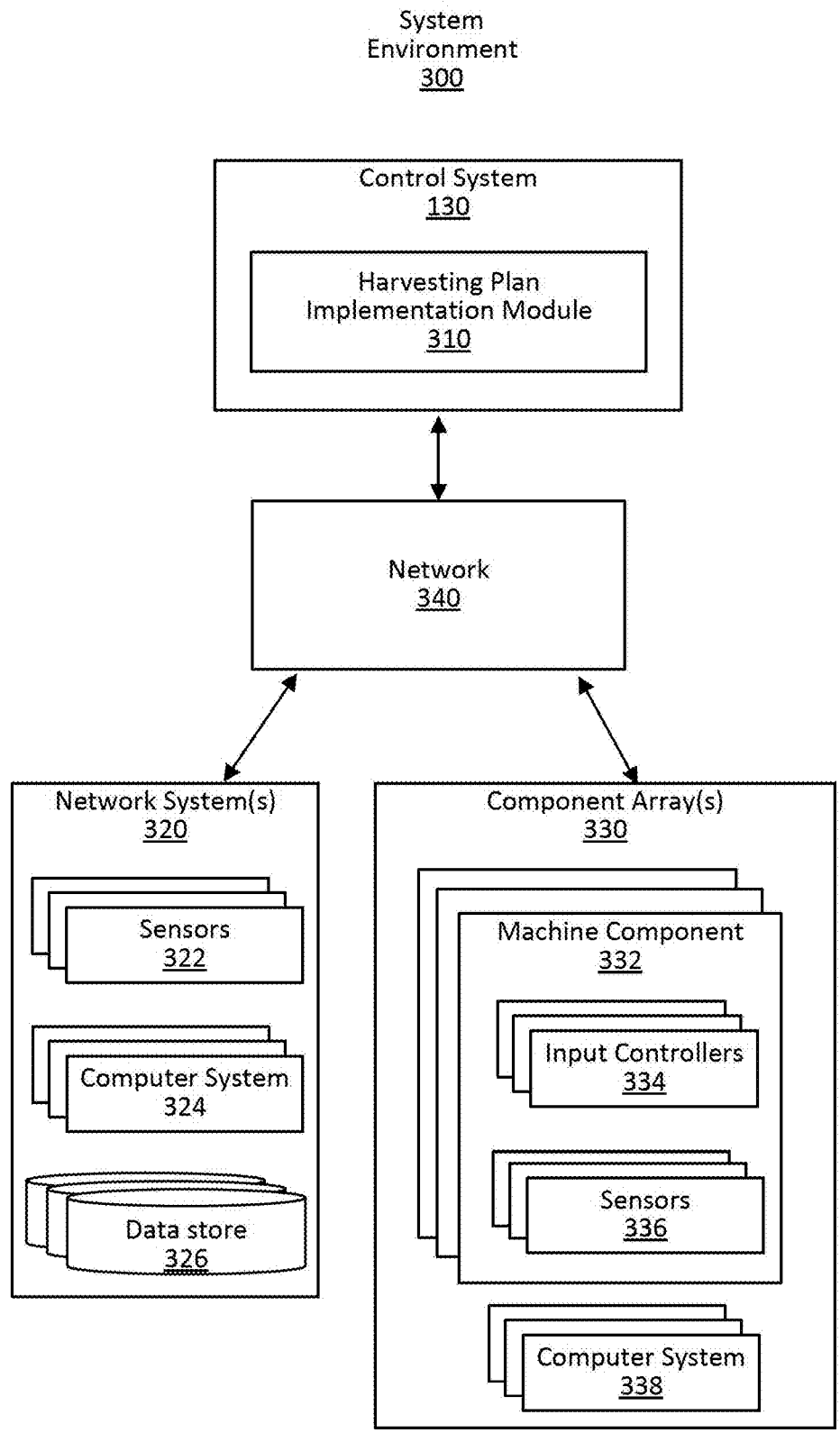
FIG. 3 is a block diagram of the system environment of a harvesting machine, according to an example embodiment

FIG. 3 is a block diagram of the system environment for the harvesting machine, according to an example embodiment In this example, the control system 130 is connected to one or more network systems 320, and a component array 330 via a network 340 within the system environment 300. The control system 130 may include additional or fewer components, and/or the components may be arranged in a manner different than what is illustrated. Moreover, the functionality of various elements in the control system 130 may be different than described, however, on par, the control system 130 enables the harvesting machine 100 to implement harvesting actions of a harvesting plan.

Network systems 320 generate data representing information useful in implementing harvesting actions for a harvesting plan in an operating environment 200. The network system 320 includes various systems whose data is accessible by the harvesting machine 100 but is not generated by the harvesting machine 100 itself. Network system 320 may include one or more sensors 322, one or more computer systems 324, and one or more data stores 326.

In an example configuration, the network system 320 measures, e.g., information about the operating environment (e.g., positions of trees in an orchard), the harvesting machine 100, and current operating conditions and generates data representing those measurements. For instance, the sensors 322 may include a rainfall sensor that measures rainfall in the operating environment, a wind sensor that measures windspeed, a temperature sensor that measures temperature, etc. The network system 320 may include one or more cameras, and the network system 320 may generate data based on those images. For example, the network system 320 may include a satellite that generates images that are processed to locate, e.g., the position of trees or the health of an orchard.

The computer system 324 may process measured data to provide additional information that may aid in determining and implementing harvesting actions for a harvesting plan. For instance, a computer system 324 may access an image of an operating environment 200 and calculate an expected yield of the orchard or may access historic weather data and determine a recommended time to harvest fruit from trees in the operating environment 200.

The data store 326 stores historical information regarding the harvesting machine 100, the operating environment 200, etc. that may be useful in determining and implementing harvesting actions for a harvesting plan. For instance, the data store 326 may store results of previously implemented harvesting plans and harvesting actions for an operating environment 200, a nearby operating environment, the region including the operating environment, etc. The historical information may have been obtained from one or more sources in the system environment 300 (e.g., measuring the location of a tree in an orchard with a first harvesting machine 100, and measuring the location of the tree in the orchard using satellite images). Further, the data stores 326 may store results of specific harvesting actions in the operating environment 200 or results of harvesting actions taken in nearby operating environments having similar characteristics. The data store 326 may also store historical weather, flooding, orchard use, tree types, etc. for the operating environment 200 and the surrounding area. Moreover, the data stores 326 may store any information measured by other elements (e.g., component array 330) in the environment 300.

The component array 330 includes one or more machine components 332 and one or more computer systems 338 of the harvesting machine 100. Elements of the component array can take harvesting actions for implementing a harvesting plan (e.g., shaker system, harvester system, etc.). As illustrated, each machine component 332 has one or more input controllers 334 and one or more sensors 336, but a machine component 332 may include only sensors 336 or input controllers 334. For example, a machine component 332 may be a shaker system 110 including its corresponding input controllers and sensors, a machine component 332 may be a speed sensor, or a machine component 332 may be an input controller for a sensor of the identification system 120.

An input controller 334 controls the function of the element. For example, an input controller 334 may receive machine commands via the network 340 and actuate, modify, trigger, or control the machine component 332 in response. A sensor 336 generates data representing measurements of the operating environment 200 and provides that data to other systems and components within the system environment 300. The measurements may be of a machine component 332, the harvesting machine 100, the operating environment 200, etc. For example, a sensor 336 may measure a configuration or state of the machine component 332 (e.g., a setting, parameter, power load, etc.), measure conditions in the operating environment 200 (e.g., moisture, temperature, etc.), capture information representing the operating environment 200 (e.g., images, depth information, distance information), and generate data representing the measurement(s). The computer system 338 may be used to process information in the system environment 300 before propagating the information in the system environment 300.

The control system 130 includes a harvesting plan implementation module 310 ("implementation module"). The implementation module 310 receives information from network systems 320 and the component array 330 and implements a harvesting plan in the operating environment 200 with the harvesting machine 100. The implementation module 212 is described in greater detail in FIG. 4.

The network 340 connects elements of the system environment 300 to allow various computer systems, microcontrollers, devices, etc. to communicate with each other.

In some embodiments, one or more of the elements in the system environment 300 are connected within the network as a Controller Area Network (CAN). In this case, within network 340, each element has an input and output connection, and network 340 can translate information between the various elements. For example, control system 130 receives input information from component array 332 sensors 336, processes the information, and transmits the information to computer system 338. The control system 130 generates a farming action based on the information and transmits instructions to implement the farming action to the appropriate machine component(s) 332 of the component array 330.

Additionally, in some embodiments, the system environment 300 may be other types of network environments and include other networks or a combination of network environments with several networks. For example, the system environment 300, can be a network 340 such as the Internet, a LAN, a MAN, a WAN, a mobile wired or wireless network, a private network, a virtual private network, a direct communication line, and the like. Additionally, the system environment 300 may include a combination of the various networks 340 described herein.

III.C Harvesting Plan Implementation Module

Figure 4:
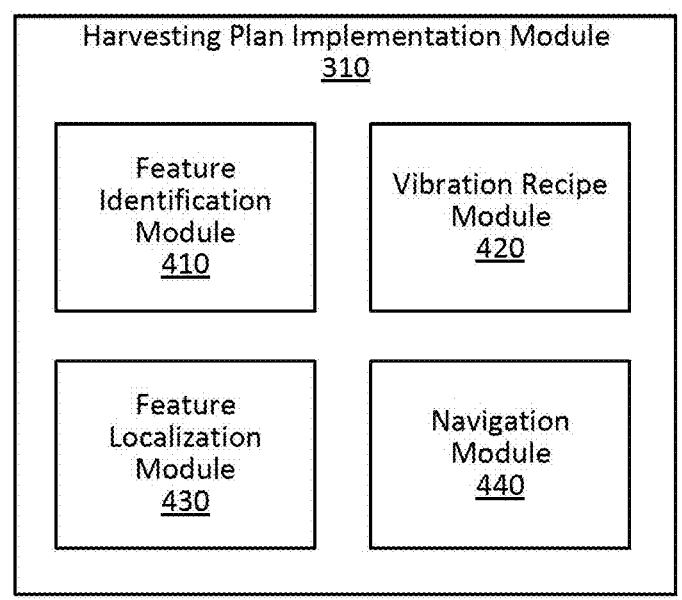
FIG. 4 illustrates an implementation module, according to an example embodiment.

The control system 130 includes a harvesting plan implementation module 310 configured to implement harvesting actions configured to execute a harvesting plan. FIG. 4 illustrates an implementation module, according to an example embodiment. The implementation module 310 includes a feature identification module 410, a vibration recipe module 420, a feature localization module 430, and a navigation module 440440. The implementation module may include additional or fewer modules, and/or the functionality of the modules may distributed in a manner different than what is described hereinbelow. Moreover, the implementation module may perform additional functions that allow a harvesting machine 100 to implement a harvesting plan.

Feature Identification Module

The implementation module 310 includes a feature identification module 410. The feature identification module 410 identifies features in images such as, e.g., the shake point of a tree. A shake point is a position on a tree trunk that the harvesting machine 100 grips to impart vibrational energy to the tree. Typically, the shake point is located between the emergence point of a tree trunk and the crotch point of a tree trunk. The emergence point of a tree trunk is where a tree trunk emerges from the substrate (or the ground plane or mesh representing the substrate). A crotch point is a position on the tree trunk where the trunk splits into two or more branches for the first time.

To identify the shake point, the feature identification module 410 applies a feature identification model to the image. The feature identification model is trained to identify the shake point of a tree based on latent information representing the tree in the image. To expand, an image of a tree (whether it be captured by the identification system 120 or accessed by the control system 130 in the system environment 300) is an array of pixels. Each pixel has, e.g., a location (e.g., pixel coordinate) and a pixel value (e.g., RGB value). In aggregate, the locations and pixel values of the image include latent information that represents the tree and various features that make up the tree. For instance, the latent information may represent the trunk, the branches, the crotch point, the emergence point, etc. Thus, when the feature identification model is applied to the image, the feature identification model identifies, e.g., the trunk, the emergence point, and the crotch point of the tree using the latent information in the pixels of the image. Depending on the configuration, the feature identification model may be any number of computer-vision machine learning models such as, e.g., a deep-learning convolutional neural network.

The feature identification model may generate a virtual object representing a feature. For example, the feature identification model may generate a virtual object representing a tree. The virtual object is generated in a virtual environment representing the operating environment 200 surrounding the harvesting machine 100. In an example embodiment, the three-dimensional object may be a polygon (e.g., a rectangular prism, a cylinder, etc.) in the virtual environment. For a tree, the top surface of the polygon is positioned at the vertical position of the crotch point of the tree, and the bottom surface of the polygon is positioned at the emergence point of the tree. The remaining surfaces of the three-dimensional object connect the top surface to the bottom surface in space in a manner that approximates the trunk of the tree. That is, e.g., the width of the object will be approximately the same as the width of the trunk. Depending on the tree, the three-dimensional object may have a pitch, roll, or yaw such that it encapsulates the tree (e.g., if the tree is leaning in an image). Of course, the feature identification model may generate an object that is not a three-dimensional polygon which represents a tree, such as e.g., a set of pixels, a voxel, etc.

The feature identification model determines the shake point of the tree using the polygon generated to represent the tree. The shake point may be any point (e.g., a pixel cluster, a pixel level, a sub-pixel level, etc.) between the top surface and the bottom surface of the polygon, and, in turn, there are many possible positions of a shake point. For instance, the shake point may be (1) a position on the trunk (e.g., three-dimensional polygon) a specific amount below the top surface, (2) a position on the trunk a specific amount above the bottom surface, (3) a threshold distance below the top surface, (4) a threshold distance above the bottom surface, (5) a position adhering to a ratio between an amount of trunk above the shake point to an amount of trunk below the shake point, (5) a position on the trunk a specific distance within the tree boundaries (e.g., based on the diameter), (6) a position of the identified shake point relative to an identified graft point (e.g., ensuring that the shake point is not the graft point, where the graft point is a position where a tree where it is grafted onto a root stock), etc. For any of the above definitions, the shake point may be on the surface of the polygon or internal to the polygon. Other definitions of the shake point are also possible, and various definitions of shake point can be combined to create more complex definitions of shake point.

Additionally, in some configurations, the feature identification model determines the shake point of the tree using solely the latent information in the image representing the tree. For instance, the feature identification model may input an image and output the shake point, where the shake point is identified using the latent spatial and color information in the pixels. Moreover, in some configurations, the feature identification model may identify a shake point using both the latent information of the image and a generated three-dimensional object.

The definition of shake point may vary based on the characteristics of the identified tree. For instance, the shake-point may be a first ratio (e.g., definition (5)) for a first species of tree and a second ratio for a second species of tree, or the shake point may be a maximum height (e.g., definition (1)) for a first type of tree, or a minimum height for a second type of tree (e.g., definition (2)). Additionally, the definition of shake point may include a combination of the definitions defined above. For instance, the shake point may be a minimum height above the substrate, but also a threshold distance away from the crotch point.

Figure 5A:
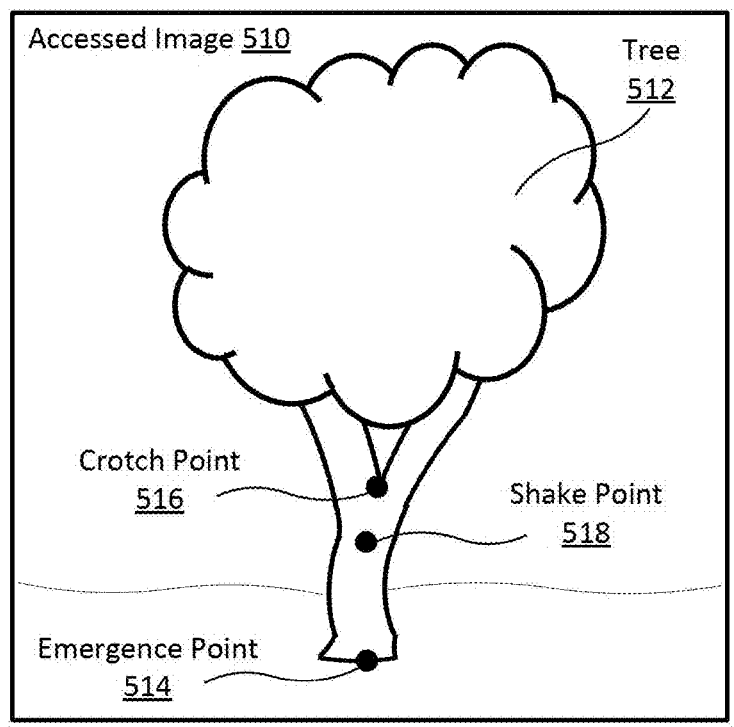
FIG. 5A shows an accessed image of a tree with its various parts, according to an example embodiment.
Figure 5B:
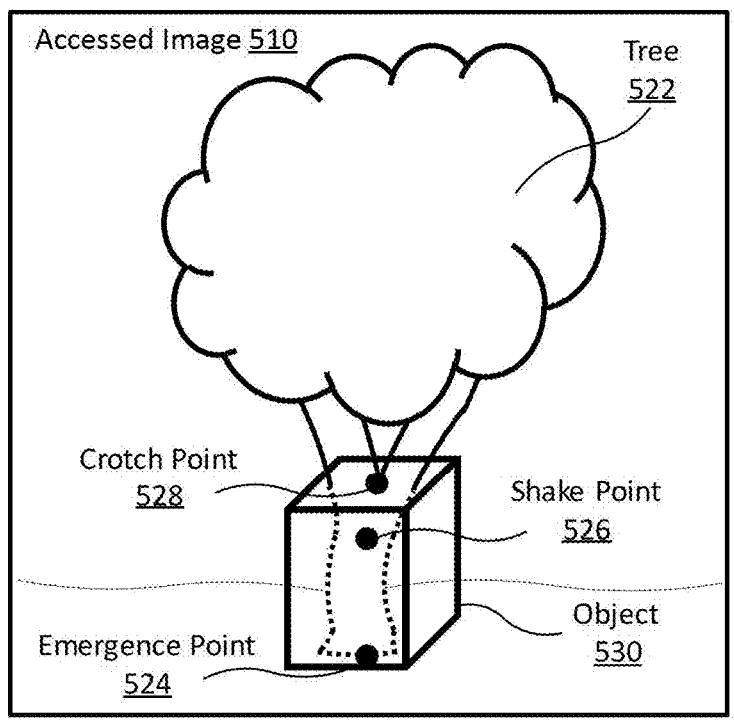
FIG. 5B shows a virtual object representing the tree generated by the feature identification model, according to an example embodiment.

To illustrate, FIG. 5A shows an accessed image of a tree with its various parts, according to an example embodiment. The accessed image 510 shows a tree 512 including an emergence point 514, a crotch point 516, and a shake point 518 of the tree. FIG. 5B shows a virtual object representing the tree generated by the feature identification model, according to an example embodiment. For ease of understanding, the virtual object 530 is shown with the accessed image shown in FIG. 5A. In this case, the virtual object is a rectangular prism but could be other polygons (e.g., a cylinder). The virtual object 530 is overlaid on the accessed image 510 relative to the emergence point 524 and the crotch point 526 of the tree 512. The shake point 522 is shown on the surface of the virtual object 530.

Returning to FIG. 4, in some configurations, the feature identification module also determines the harvesting position of the harvesting machine 100 for the identified shake point of each tree. The harvesting position is the position where the harvesting machine 100 locates itself to shake the tree at the shake point to harvest fruits. The harvesting position, more generally, enables the shaker system 110 to grip the shake point using the clamping assembly. To do so, the feature identification model may access the current position of the harvesting machine 100, the position of the shake point, and the characteristics of the clamp articulation system to determine a position of the harvesting machine 100 that allows the clamp articulation system to move the clamping assembly to grip the shake point when at the harvesting position.

To illustrate, consider an example where a harvesting machine 100 is traveling through an orchard. The harvesting machine 100 captures an image of a tree and identifies a shake point for that tree. The harvesting machine 100 accesses the characteristics of the clamp articulation system and determines a range of motion for the clamping assembly. Based on the range of motion of the clamping assembly, the feature identification module determines a harvesting position that allows the clamp articulating system to move the clamping assembly to grip the shake point that is within the range of motion. The harvesting machine 100 may autonomously move to the determined harvesting position. In this manner, the harvesting machine 100 moves to a harvesting position within reach of the clamping assembly of the harvesting machine 100.

Additionally, the feature identification module can be used to label additional features in an accessed image. For instance, the feature identification model can identify, e.g., a left row and/or a right row of trees in a tree array, fruit or nuts on the substrate, fruits or nuts in the canopy, a horizon line, navigable substrate, unnavigable substrate, a sky, obstructions, etc. Other labeled features are also possible.

Still, further, the feature identification module can assign position information and other metadata to each identified feature such that the harvesting machine 100 develops localized knowledge of identified features surrounding it in the environment. The feature identification module 410 can store the information and metadata in a datastore of the implementation module. For instance, the feature identification module can store the position of features such as shake points, three-dimensional objects representing trees, and harvesting positions in a datastore of the implementation module 310. The stored positions may be in a global reference frame and/or a local reference frame, depending on the configuration of the harvesting machine 100.

Correspondingly, the feature identification module can access various positional information and metadata within the system environment. For instance, the feature identification module may access the position of the harvesting machine 100 from, e.g., the feature localization module 430, a position of the harvesting machine 100 along a harvesting route from, e.g., the navigation module 440440, pose information from various sensors via the system environment 300, etc. Moreover, the feature identification module 410 can determine, if needed, positional information of the harvesting machine 100 to determine a shake point (e.g., by using a sensor or accessing it from the environment).

Additionally, the feature identification module can identify features corresponding to other features. For instance, in the example of an identified tree, the feature identification module may identify a state of the tree such as, e.g., young, old, small, large, diseased, healthy, etc. It may also identify spatial or location-based features for the tree. For instance, the feature identification module may identify the tree is leaning, at the end of the row, is out of position within the array, etc. As an added example, as an example of the identified substrate in the operating environment, the feature identification module may identify the state of the substrate such as navigable, unnavigable, wet, dirty, etc. In other words, at a high level, the feature identification module can be trained to identify any number of classes of features and those classes may be associated in various aways.

Vibration Recipe Module

The implementation module 310 includes a vibration recipe module 420. The vibration recipe module 420 determines characteristics of the vibrational energy to impart to the tree at the shake point to release fruit from the tree. The various characteristics that the vibration recipe module 420 can determine include, for example, an amplitude, a frequency, a direction, a length of time, etc. The characteristics of the vibrational energy may be dependent on the characteristics of the tree to which the harvesting machine 100 is imparting the vibrational energy. For example, the characteristics of the vibrational energy may depend on, for example, the size, radius, density, species, shape, angle, age, etc. of the tree. Similarly, the characteristics of the vibration energy may be based on the characteristics of the harvesting machine 100. For example, the characteristics of the vibrational energy may depend on the configuration of the clamping assembly, the harvesting position, the position of the harvesting machine 100, etc. Finally, the characteristics of the vibrational energy may be based on the characteristics of the operating environment. For example, the characteristics of the vibrational energy may depend on, for example, weather in the operating environment, a type of substrate, wind speed and direction, etc.

In some configurations, the vibration recipe (e.g., energy, duration, placement, etc.) may be a direct output of the feature identification model. That is, the vibration recipe for a tree may be an identified feature in images. So, for example, each the feature identification module may identify trees in images and also identify the vibration recipe for that tree.

Feature Localization Module

The implementation module 310 includes a feature localization module 430. The feature localization module 430 determines the position of features in the operating environment 200. In an embodiment, the feature localization module 430 determines feature positions using images captured from a single sensor (e.g., camera) of the identification system 120 and without accessing a global reference frame (e.g., without using global positioning satellite coordinates). Moreover, in an embodiment, the feature localization module 430 may determine feature positions without calculating depth information.

To determine the position of features in the operating environment 200, the feature localization module 430 accesses identified features from the system environment 300 (e.g., by the feature identification module 410). The accessed features may include a label for the feature, a three-dimensional virtual object representing a feature (e.g., a polygon representing a trunk), a three-dimensional coordinate representing the feature, etc. Notably, however, because the harvesting machine 100 is operating, in some cases, using a single vision sensor and without access to a global reference frame, the location information describing some of the features may be less accurate than appropriate for performing harvesting actions autonomously. As such, the harvesting machine 100 may employ the feature localization module 430 to identify the position of a feature more accurately in the operating environment 200 using, for instance, the position information for a feature extracted from multiple images.

To expand, the feature localization module 430 accesses and analyzes a feature stream and a pose stream from the system environment 300 to determine the position of features in the operating environment 200. Features in the feature stream are those identified by, e.g., the feature identification module 410, and poses in the pose stream are poses of the identification system 120 determined by, e.g., an inertial measurement unit of the harvesting machine or through a sequence of images, images from multiple cameras of the identification system 120, or a sequence of images from multiple cameras of the identification system 120. The feature stream and pose stream, in general, represent information describing identified features and determined poses over time. For example, the feature stream may include a data structure describing each feature, its position information, and the time it was extracted from an image, and the pose stream may include a data structure describing the pose of the identification system 120 for each image it captures and the time it captures that image.

To expand, the feature stream includes the various features identified by the harvesting machine 100 as it travels through a tree array. To illustrate, as the harvesting machine 100 travels through an orchard, it captures a series of images. Each image includes a representation of a tree in the orchard. For each image, the feature identification module 410 identifies features (e.g., an emergence point) and their associated position information based on the image. The feature identification module 410 stores, for each image, the identified features and position information in a database of the system environment 300 as the feature stream. The feature localization module 430 accesses the feature stream from the database of the system environment 300 to determine the accurate position of each feature as described below.

Similarly, the pose stream includes the pose of the identification system 120 as the harvesting machine 100 travels through a tree array. For example, as the harvesting machine 100 travels through an orchard, it captures a series of images. When it captures each image, the identification system 120 is at a particular position and orientation (e.g., its pose). The harvesting machine 100 determines the pose information (e.g., by accessing an IMU or other sensors) for the identification system 120 when it captures the image and stores that information as a pose stream in a database of the system environment 300. The control system 130 stores, for each image, a pose of the identification system 120 when it took the image. The feature localization module 430 accesses the pose stream from the database of the system environment 300 to determine the accurate position of each feature as described below.

Given this context, each identified feature in a feature stream corresponds to a pose in a pose stream. More simply, each identified feature in an image corresponds to the pose of the identification system 120 when the image including the feature was captured. As an alternative description of correspondence, the identification system 120 captures each image at a particular time. Both the pose of the identification system 120 and the features extracted from that image are linked to the particular time such that they correspond to one another.

Now, to continue, the feature localization module 430 localizes features using the feature stream and the pose stream. To do so, the feature localization module 430 generates virtual rays based on information in the feature stream and the pose stream. Virtual rays connect the position of the identification system 120 to the position of identified features in a virtual environment representing the operating environment 200. As the harvesting machine 100 travels through the operating environment 200, the virtual rays change in the virtual environment and the feature localization module 430 localizes the position of features based on the evolution of the virtual rays.

FIGS. 6A-6F provides an illustration of the feature localization module 430 determining the position of the features ("feature position") in the operating environment 200.

To begin, the identification system 120 captures an image of the operating environment 200, and the feature identification module 410 identifies features in the image. To illustrate, FIG. 6A shows an image of the operating environment captured by the identification system, according to an example embodiment. The image 610 of the operating environment 612 shows trees 614 in a tree array (e.g., an orchard). The image 610 is captured by the identification system 120 while in a first pose (e.g., position and orientation).

The feature identification module 410 analyzes the images and identifies, e.g., the emergence point, crotch point, and shake point for each tree in the image. In doing so, the feature identification module 410 may generate a virtual environment representing the environment surrounding the harvesting machine 100.

Figure 6B:
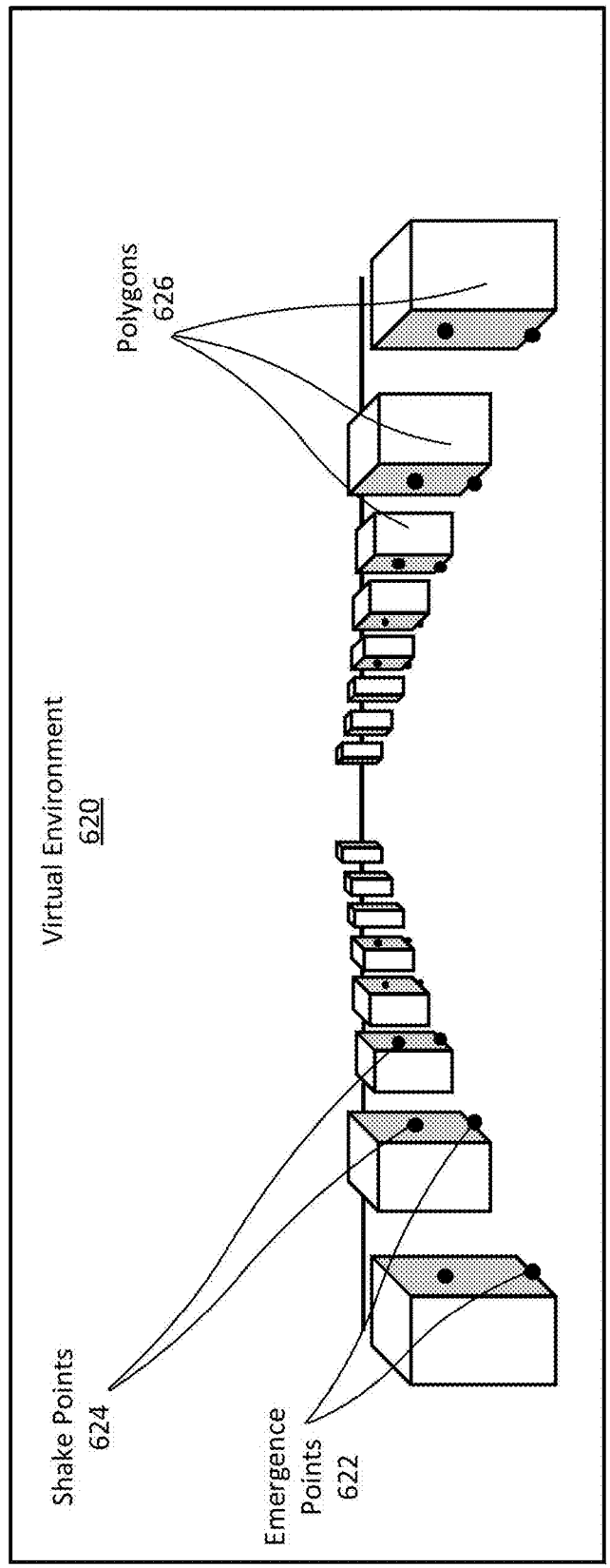

To, illustrate, FIG. 6B shows a virtual environment of the operating environment as generated by the feature identification module. The virtual environment 620 is shown in two dimensions and is a representation of the operating environment 612 shown in FIG. 6A. The virtual environment 620 shows various features identified by the feature identification module 410. For instance, the virtual environment 620 shows the emergence point 622 and the shake point 624 of each tree as identified in the operating environment 612. Additionally, the virtual environment 620 includes a three-dimensional polygon 626 representing each tree. The feature identification module 410 stores the identified features, their labels, and their positions in the feature stream in the system environment 300. Similarly, the control system 130 stores the determined pose of the identification system 120 in the pose stream in the system environment 300. Notably, in the illustrations herein, the various features are shown on the surface of the polygons for convenience and ease of understanding, but the features may also be located internal to the polygons representing the trees.

The feature identification module 410 generates a virtual ray from the position of the identification system 120 through the position of an identified feature. For convenience, the identified feature will be the emergence point of each tree, but it could be other identified features (e.g., shake points, crotch points, etc.). To do so, the feature localization module 430 accesses, from the feature stream, the position information for the emergence of each identified tree. For example, the emergence point of a first tree is at a first position, and the emergence point of a second tree is at a second position, etc. Additionally, the feature localization module 430 accesses, from the pose stream, a position of the identification system 120 corresponding to the identified emergence points (e.g., the pose of the identification system 120 when capturing the image from which the features are identified). The feature localization module 430 draws a virtual ray (e.g., a vector, data structure representing position and direction, etc.) from the position of the pose ("pose position") through the positions of the emergence points (e.g., from the pose position through the first position, from the pose through the second position, etc.).

To illustrate, FIG. 6C shows the feature localization module generating virtual rays from the pose position to the emergence point of each tree, according to an example embodiment. In the figure, each tree is illustrated by a polygon 636 in the virtual environment 630, and the emergence point 632 for each tree is a dot on that tree. The pose position 634 is shown at the bottom center of the figure. Each generated virtual ray 638 is illustrated as a line. The feature localization module 430 generates a virtual ray 638 from the pose position 634 to the emergence point 632 of each tree in the virtual environment 630. For convenience of illustration, the virtual rays are illustrated as terminating at the emergence points, but may also, depending on the configuration, extend through the emergence point 632.

As the harvesting machine 100 travels through the tree array it continues to capture images and identify features. Correspondingly, the features and feature positions in the feature stream change, and the pose positions in the pose stream change in a manner that reflects the operating environment 200 as the harvesting machine 100 travels through the tree array.

Figure 6D:
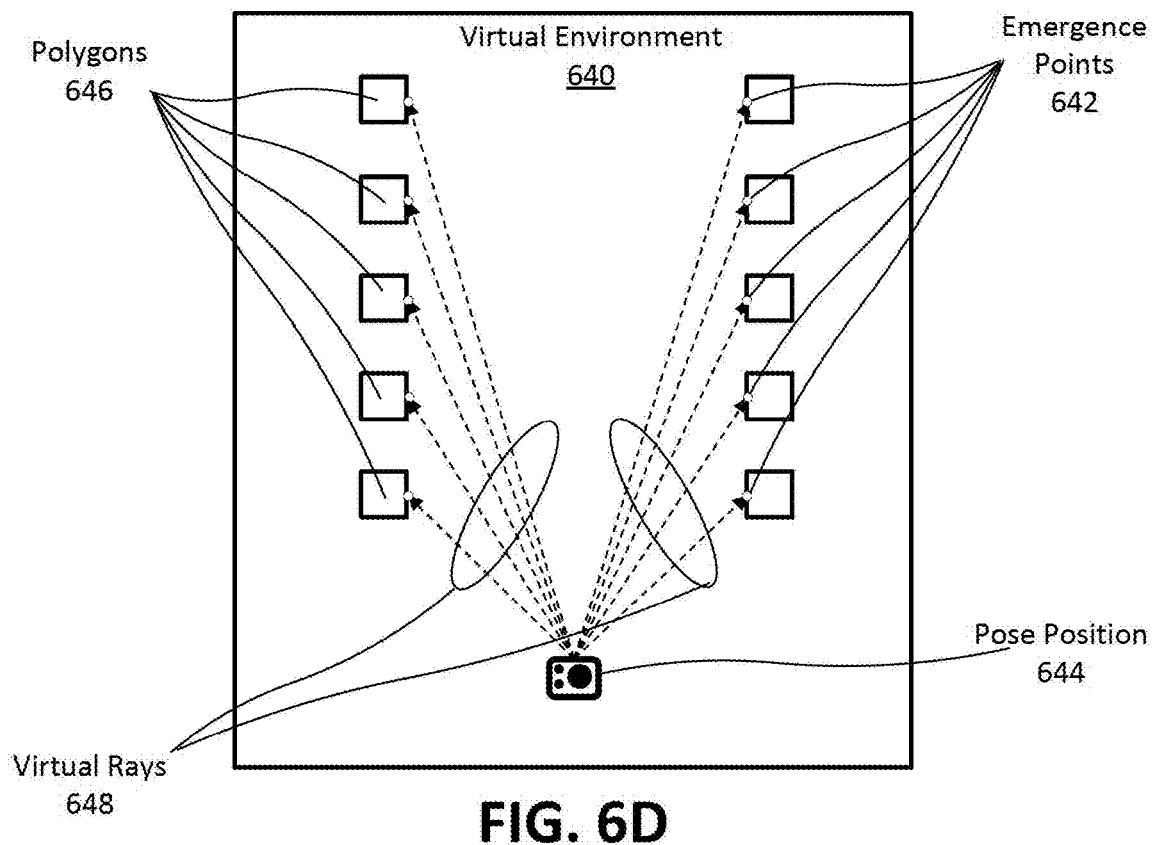
Figure 6E:
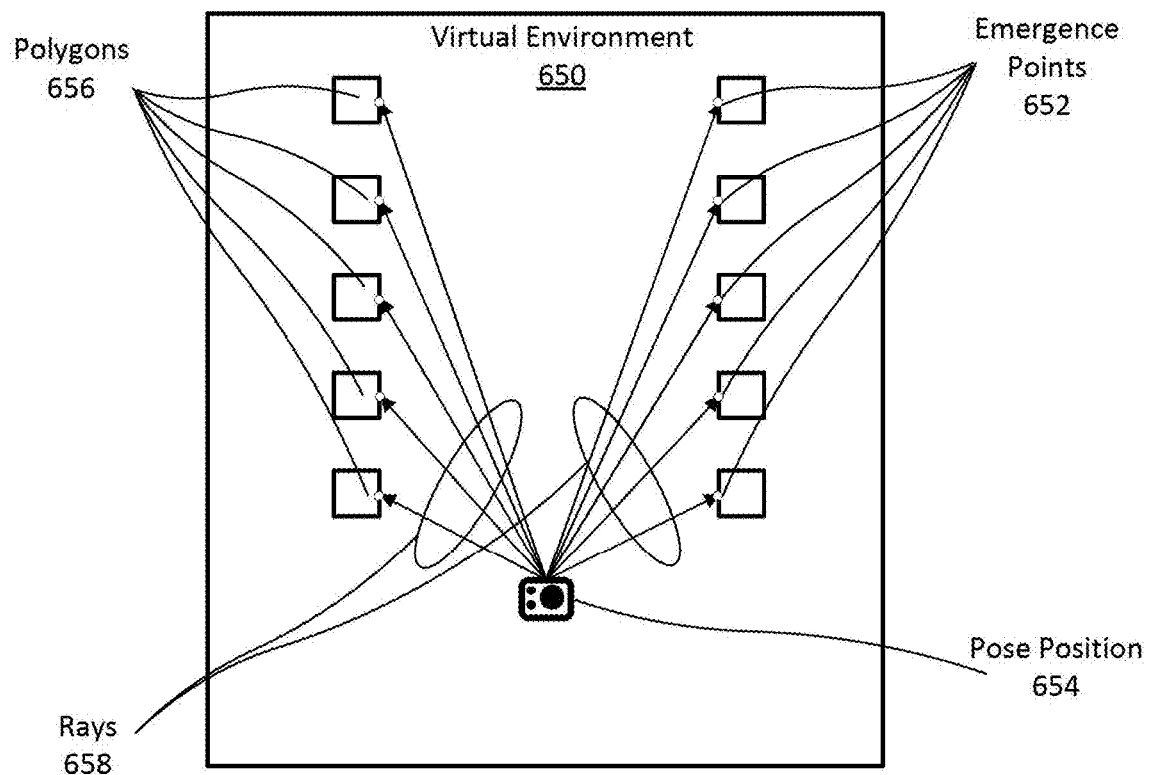

FIG. 6D-6E illustrates this evolution. FIG. 6D shows a virtual environment generated by the feature localization module at a first time, according to an example embodiment. Notably, this virtual environment 640 is shown from a top-down view (rather than the isometric view of FIG. 6C) for ease of understanding. In the figure, each tree is illustrated by a polygon 646, and the emergence point 642 for each tree is illustrated by a dot on that tree. The pose position 644 is represented by the identification system 120. The figure also shows the generated virtual rays 648 at the first time. The virtual rays 648 are represented by dotted arrows, and the virtual rays are projected from the pose position 644 to the emergence point 642 of each polygon 646.

FIG. 6E illustrates a virtual environment generated by the feature localization module at a second time after the first time, according to an example embodiment. In the illustrated virtual environment 650, each tree is illustrated by a polygon 656, and the emergence point 652 for each tree is illustrated by a dot on that tree. The pose position 654 is represented by the identification system 120. The virtual rays 658 are represented by solid lines. However, this figure represents a second time after the first time and the harvesting machine 100 has moved forward in the operating environment 200. As such, the pose position 654 is closer to the trees than in FIG. 6D, and, correspondingly, the virtual rays are different in FIG. 6E than in FIG. 6D

The harvesting machine 100 localizes features using the change of virtual rays for each feature as the pose of the identification system 120 changes. To expand, for a given feature (e.g., an emergence point of a tree), the virtual rays projected from the identification system 120 through the emergence point change as the pose of the identification system 120 changes. However, because the emergence point is stationary, all the virtual rays form a vertex. A vertex is the point where all virtual rays for a feature intersect in the virtual environment. Additionally, a vertex does not necessarily represent the absolute intersection of virtual rays. The vertex may, more simply, represent a point in virtual space where virtual rays approximately intersect (rather than absolutely intersect). For each feature, the position of the vertex is considered the localized position of that feature in the virtual environment. The localized position typically has a higher fidelity than the position of the feature determined by the feature identification module 410.

Figure 6F:
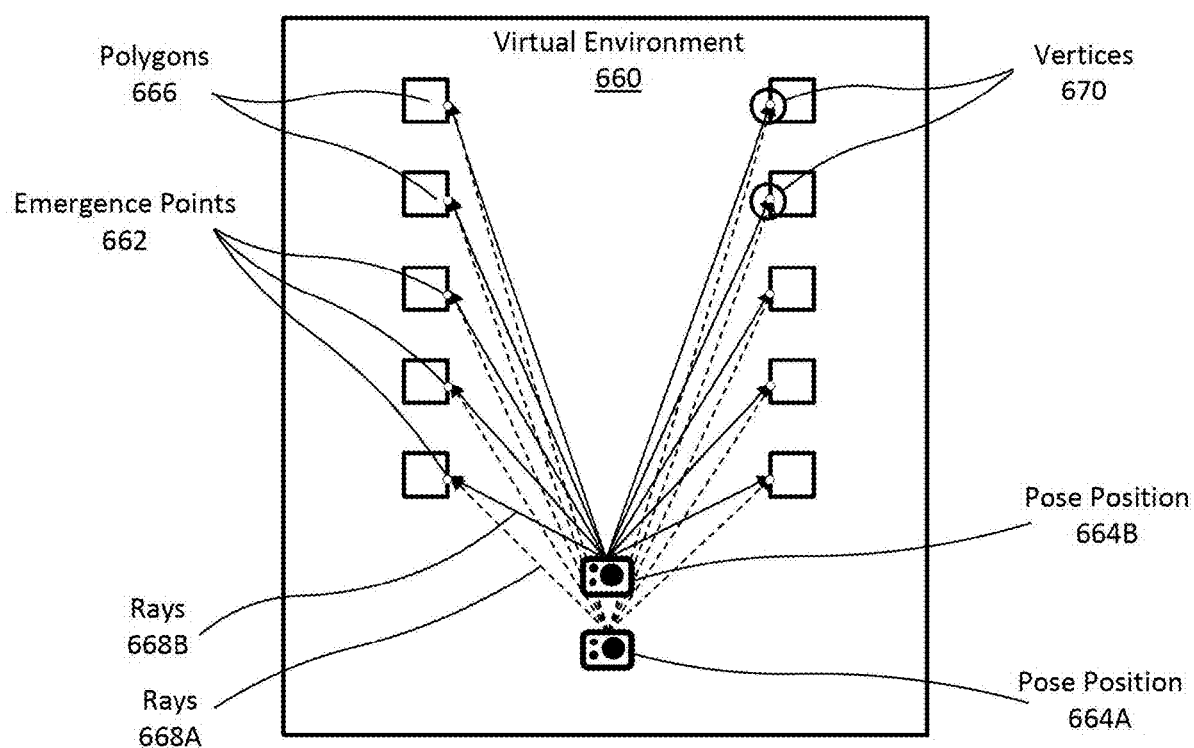

To illustrate, FIG. 6F shows the virtual rays creating a vertex, according to an example embodiment. In the figure, the virtual rays 668A generated at the first time are dashed lines, and the virtual rays 668B generated at the second time are solid lines. The virtual rays 668A at the first time correspond to the first pose position 664A, and the virtual rays at the second time correspond to the second pose position 664B. Noticeably, virtual rays 668A from the first time and virtual rays 668B the second time terminate at the same point—the emergence point 662—for each tree (represented by polygons 666). The intersection of those lines form a vertex 670. The vertex 670 is considered the position of the emergence point 662 in the virtual environment 660.

Thus, the feature localization module 430 can triangulate the position of each feature in the environment using the feature stream and the pose stream by, for example, determining an intersection of virtual ray vectors connecting the identification system 120 to a feature as the pose of the identification system 120 changes. The feature localization module 430 can make this calculation based on any of: the feature position of each feature, the pose position of the identification system, the virtual ray vector between the feature position and pose position, the change of the pose position, and the change of the virtual ray vector for each feature.

Again, in a configuration, the harvesting machine 100 can localize feature positions using only a stream of images captured from a single image sensor. That is, the feature localization module 430 can identify the position of trees in a tree array without a depth-sensing system such as LIDAR or stereo vision cameras. Moreover, because the position localization module 430 relies on position information generated by sensors of the harvesting machine 100 (e.g., an IMU), the position localization module 430 can determine the position of trees in a tree array without determining its position using a global reference frame (e.g., without GPS coordinates). However, in additional embodiments, the feature localization module 430 determines the position using a single sensor and an accessed global reference frame or using multiple sensors and an accessed global reference frame.

Additionally, as described above, the feature localization module can localize the position of any feature identified by the feature identification module 410 using the demonstrated triangulation process. So, while the example provided above illustrates feature localization for emergence points, the feature localization module can localize, e.g., the harvesting position, crotch points, canopy, fruit, etc.

Generally, the feature localization module 430 localizes a feature using a local reference frame (e.g., relative to the harvesting machine 100). Thus, as the harvesting machine 100 travels through the operating environment, it uses the determined localized position of various features to generate a three-dimensional environment representing its local operating environment 200. Over time, as the harvesting machine travels, that three-dimensional environment may grow to represent an operating environment 200 larger than what is locally visible to the harvesting machine 100. In other words, the feature localization module 430 generates a high-fidelity feature map including each identified feature as it travels through the operating environment.

In some embodiments, the feature localization module 430 may be able to assign its feature map (which was generated using a local reference frame) to a global reference frame. For instance, a harvesting machine 100 may be aware of its position relative to a global reference frame as it enters an orchard but may lose its ability to access that global reference frame within the orchard. In this case, the harvesting machine may impute globally referenced position information to its locally measured position information using its most recently measured global position. Similarly, the harvesting machine 100 may update local position information using globally referenced position information any time the harvesting machine 100 can access a global reference frame.

Notably, as disclosed throughout the specification, the feature localization module 430 and the corresponding process for triangulation and/or localization of the harvesting machine 100 based on identified features is described as employing an identification system 120 comprising a single monocular camera system. However, in some embodiments, the identification system 120 may also comprise additional monocular camera systems (e.g., 2, 3, 4, 5, 10, etc.) employing the same algorithms. So, for instance, the harvesting machine 100 may comprise an identification system 120 with a monocular camera facing forwards, a monocular camera facing forwards and rightwards, and a monocular camera facing forwards and leftwards. In these multi-mono camera configurations, the processes described herein are still performed and the control system 130 may be configured to aggregate and verify the data generated by multiple cameras. That is, the location of the harvesting machine 100 relative to the feature may be calculated and validated based on the information from three different cameras of the identification system rather than just a single camera. These multi-mono systems allow for greater feature localization fidelity throughout the operating environment and alleviate problems that come from scale, larger distances, dust, debris, etc.

Navigation Module

The implementation module 310 includes a navigation module 440. The navigation module 440 generates instructions that cause the harvesting machine 100 to autonomously travel through the operating environment efficiently and safely. Autonomously navigating through an orchard is a complex complicated endeavor due to, in some cases, limited access to high-fidelity data. To expand, for safe and efficient travel through an orchard, a harvesting machine 100 needs a high-fidelity (e.g., both accurate and precise), up-to-date (e.g., real-time or near real-time) accounting for each tree, and each part of each tree, in the operating environment 200. Without this high-fidelity mapping of the tree array, the harvesting machine 100 will be unable to maneuver through the orchard safely and efficiently, as it, in effect, does not have accurate ground truth information.

Notably, many orchards have a low-fidelity (e.g., somewhat accurate and somewhat precise), previous accounting (e.g., taken in the past) of trees and their constituent parts in the orchard. To illustrate, many orchards have been previously imaged by satellites (e.g., a "low-fidelity image"), and those images can provide a reasonable approximation for at least the position of each tree in an orchard. However, because many parts of the tree are obscured by the canopy, those images cannot provide an accurate accounting of each part of the tree. This is true for other types of low-fidelity images such as those captured by drones, planes, etc.

The navigation module 440 can generate a route through a tree array based on low-fidelity images. For example, the navigation module 440 can determine the approximate location of each tree in an orchard based on information in a low-fidelity image and generate a route through the orchard based on the determined locations. In turn, a control system 130 can cause the harvesting machine 100 to travel the determined route through the orchard. Unfortunately, because the route was generated based on a low-fidelity image, the harvesting machine 100 may be routed to harvest a tree that no longer exists in the orchard, may be routed such that the shaker system 110 is unable to harvest fruit from the tree (because the tree is too far from a position of the harvesting machine 100 on its route), may incorrectly travel the route if its position measurement becomes inaccurate relative to the global reference frame, etc.

As such, the navigation module 440 can generate a route using high-resolution spatial information generated by the harvesting machine 100. As described above, high-resolution spatial information can be generated in a variety of manners within the system environment 300. For instance, the feature localization module 430 can determine high-resolution spatial information for each tree in an operating environment 200 relative to the harvesting machine 100. To illustrate, as described in more detail above, the feature localization module 430 can determine the high-accuracy position of each feature in the operating environment relative to the position of the harvesting machine 100 using the feature stream and pose stream. Therefore, as the harvesting machine 100 travels through the orchard, can generate a high-fidelity accounting of each tree (e.g., a feature) in real time.

In various configurations, a route through a tree array may be generated using information from both low-fidelity images and high-resolution spatial information generated by the harvesting machine 100 in real time.

In an example configuration, the navigation module 440 generates an initial route through an orchard using a low-fidelity image. Subsequently, as the harvesting machine 100 travels through the orchard generating high-fidelity spatial information, the navigational module 440 may generate a modified route based on the high-fidelity spatial information. For example, the navigational module 440 may determine the initial route does not travel close enough to a tree to harvest that tree (given the constraints of the shaker system 110) and, to remedy this, modify the initial route such that the harvesting machine 100 travels sufficiently close to the tree to harvest that tree.

In an example configuration, the navigation module 440 generates high-fidelity spatial information describing each tree in its local reference frame and accesses low-fidelity information describing each tree in the global reference frame. The navigation module 440 can then compare trees identified in the local reference frame to trees identified in the global reference frame and identify differences between the two. The navigation module 440 may generate or modify routes through the tree array based on the identified differences.

In an example configuration, the navigation module 440 generates a route to, e.g., an edge (or some other location) of the orchard based on a low-fidelity image of the orchard, and localizes the position of the harvesting machine 100 on the edge of the orchard using the position of trees determined from the low fidelity image. Once the position is localized on the edge (or some other location) of the orchard, the navigation module 440 uses high-fidelity spatial information determined by the harvesting machine 100 to generate a route through the orchard to perform a harvesting plan.

In an example configuration, the navigation module 440 generates a route that moves from one row of the orchard to another row of the orchard (e.g., turns around). In this case, the navigation module 440 may leverage both the low-fidelity image and the high-fidelity spatial information. To expand, as the harvesting machine 100 reaches the end of the row in a tree array, the harvesting machine 100 generates less high-fidelity spatial information because there are fewer trees in the operating environment 200 of view of the identification system 120. When this occurs, the harvesting machine 100 may leverage position information of the low-fidelity image to localize the position of the harvesting machine 100 as it turns around and moves towards the next row in the orchard. Once the harvesting machine 100 turns and again obtains high-fidelity spatial information representing the next row of trees, the navigation module 440 may employ that high-fidelity information to generate or modify a route through the tree array.

Similarly, the navigation module 440 may generate a route that adheres to a virtual fence representing a boundary in which the orchard exists using both the low-fidelity and high-fidelity spatial information. For instance, the navigation module may generate a path based on the low-fidelity information that is projected to keep the farming machine withing the boundary, and uses the high-fidelity information to ensure that remains the case. The virtual boundary may also represent other areas, such as part of an orchard for harvesting, a part of an orchard with a particular tree type, etc.

In various configurations, the navigation module 440 can optimize a route through an orchard using information from low-fidelity images and/or high-resolution spatial information generated by the harvesting machine 100 in real time.

For example, the navigation module 440 can generate (or modify) a route through an orchard such that the harvesting machine 100 positions itself near each tree for harvesting that tree based on the machine constraints of the harvesting machine 100. To expand, consider a route through the orchard generated by a harvesting machine 100 by localizing its position in the orchard based on a low-fidelity image of the orchard and generating the route through the orchard based on high-fidelity spatial information generated by the harvesting machine 100.

When generating the route, the navigation module 440 can optimize the route based on the machine constraints of the harvesting machine 100. To illustrate, recall again that the clamp articulation system has maximums and minimums for its various ranges of motion. As such, to efficiently harvest trees in the orchard, the generated route should move from tree to tree such that the harvesting position for each tree is within the machine constraints of the clamping system. For example, the harvesting position should be closer to the tree than the maximum range of motion, and farther from the tree than the minimum range of motion. In this manner, the harvesting machine 100 may move from tree to tree such that the harvesting position places each tree within the machine constraints of the clamping system (e.g., the clamp articulating system can position the shaker system 110 to harvest the tree without additional moving the harvesting system).

In another example, the navigation module 440 can generate or modify a route using high-fidelity spatial information such that it improves a characteristic of the route.

Characteristics may include navigation time (e.g., time spent along the route), fuel consumption, shaker system 110 motion (e.g., decreasing the amount of movement for the shaker system 110 between each tree), etc. In some examples, the navigation module 440 can generate or modify a route to account for trees that lean into or out of the tree row.

Overall, the navigation module 440 employs both low-fidelity spatial information and high-fidelity spatial information to generate and modify routes in the operating environment 200.

Additionally, the navigation module 410 may generate a path for the harvesting machine 100 that allows it to continue movement while it is harvesting fruit from a tree. That is, the harvesting machine 100 may engage the shaker system 110 to shake a tree, and the harvesting machine may continue moving to the next shake point on the path. Moreover, the navigation module 440 is configured to identify navigable terrain when generating paths and movement instructions for the farming machine. For instance, the navigation module 440 may employ an obstacle recognition module that determines terrain in the operating environment 200 is impassable by the harvesting machine 100 and may generate paths or movement instructions that compensate for those obstacles.

IV. Implementing a Harvesting Plan

As described above, a harvesting machine 100 in an operating environment 200 includes various elements that are integrated to implement harvesting actions of a harvesting plan. For instance, an operator may define a harvesting plan of harvesting the fruit of every tree in an orchard, and the harvesting machine 100 may generate a series of harvesting actions to implement that harvesting plan. Harvesting actions in the harvesting plan may include, e.g., locating the harvesting machine 100 in the operating environment, identifying a shake-point of a tree located in the operating environment, shaking the tree to harvest fruit in the operating environment, and navigating between trees in the operating environment. Each of these harvesting actions may include one or more harvesting actions themselves. For instance, navigating between trees in the operating environment may include harvesting actions of localizing the harvesting machine 100 in an operating environment using a low-fidelity image, identifying shake points for trees in an image, determining a path among the trees, and actuating locomotion mechanisms to navigate between the trees.

Described below are several example harvesting action workflows working for implementing a harvesting plan to accomplish a harvesting objective of a manager.

IV.A Autonomously Shaking a Tree to Harvest Fruit

Figure 7:
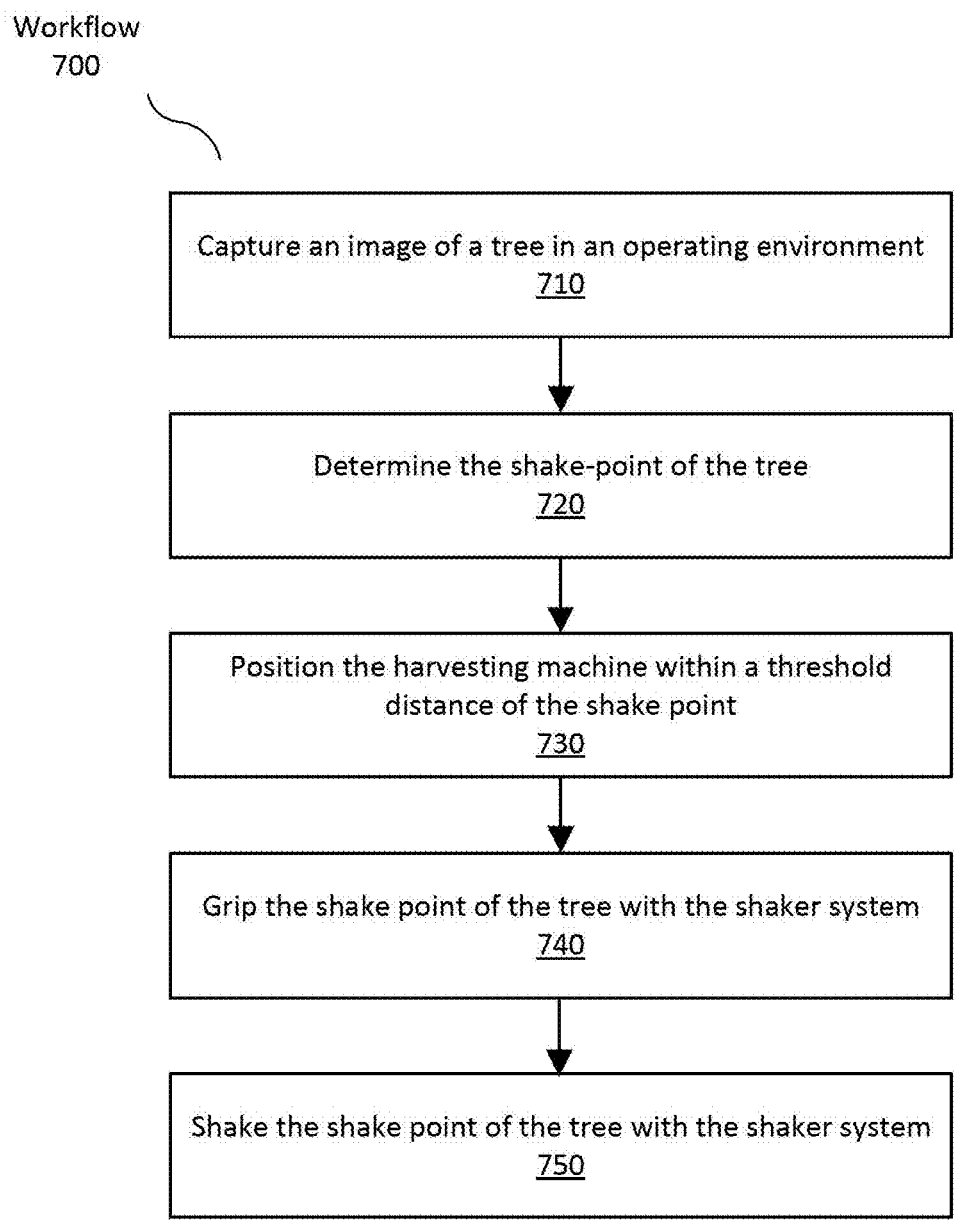
FIG. 7 shows a workflow diagram for a harvesting machine to shake a tree to harvest fruit, according to an example embodiment.

The harvesting machine 100 is configured to autonomously shake a tree to harvest fruit in the operating environment. To illustrate, FIG. 7 shows a workflow diagram for a harvesting machine to shake a tree to harvest fruit, according to an example embodiment. The workflow diagram 700 may include additional or fewer steps, the steps may occur in a different order, and one or more of the steps may be repeated or omitted.

In this example, the harvesting machine 100 executes a harvesting plan to harvest almonds in an almond orchard. As such, the tree array in the operating environment includes almond tree spaces at regular intervals in tree rows. Each almond tree has a trunk extending vertically from the substrate, one or more branches, one or more leaves, and fruits suspended in the canopy of the tree. The harvesting machine 100 includes a control system 130, an identification system 120, a shaker system 110, and a harvesting system. The control system 130 controls the identification system 120 to capture images of trees in the orchard, the shaker system 110 to grip and shake trees, and the harvesting system to harvest any almonds shaken from the tree. In the example workflow, the harvesting machine 100 is operating autonomously, and the sensor of the identification system 120 is a single camera system capturing a series of images.

The control system 130 instructs a sensor of the identification system 120 to capture 710 an image (or video) of a tree in the operating environment. The captured image comprises an array of pixels, and the array of pixels comprises information representing an almond tree in the operating environment 200. That is, the latent information contained in the array of pixels (e.g., arrangement, RGB values, relative pixel values, etc.) represents the almond tree. The latent information of the tree may represent, e.g., the trunk, the branches, various points on the trunk, leaves, fruit, etc. The captured image may also comprise information about other objects in the operating environment (e.g., the harvesting machine 100, the substrate, additional trees, etc.).

The control system 130 employs the feature identification model to determine 720 a shake-point on the tree. That is, the control system 130 inputs the captured image of the tree to the feature identification model and receives a position of the shake-point of the tree in response. As described herein, the control system 130 identifies the shake-point by identifying the crotch point of the tree, identifying the substrate, generating a polygon representing the trunk of the tree based on the identified crotch point and substrate, and determining the shake-point based on the generated polygon.

The control system 130 employs the movement mechanism to position 730 a vehicle body of the harvesting machine 100 within a threshold distance of the shake point. To do so, the control system 130 may actuate the transport system to position the harvesting machine 100 such that the shaker system 110 may grip and shake the tree (e.g., move within a threshold distance).

The control system 130 employs the shaker system 110 to grip 740 the shake point on the trunk of the tree using the first arm and the second arm of the shaker system 110. Gripping the tree may include positioning, using the clamp articulating system of the shaker system 110, the shaker system 110 such that it can grip the shake point. For instance, the control system 130 may actuate various components of the shaker system 110 such that it moves through its degrees of freedom (e.g., vertical and horizontal) and positions the first arm and the second arm on opposing sides of the tree trunk at the shake-point. Additionally, gripping the tree may include positioning, using the clamp articulating system, the first arm and the second arm of the shaker system 110 such that each arm contacts the tree trunk on opposing sides of the trunk (e.g., gripping).

Gripping the shake point may also employ various sensors as a feedback system to appropriately grip the tree trunk at the shake point. For example, the identification system 120 and other sensors may measure the position of the first arm and the second arm relative to the shake point such that the arms are actuated appropriately. Similarly, one or more sensors may measure the grip strength of the first arm and the second arm on the tree trunk such that the harvesting system may appropriately shake the tree to harvest nuts.

The control system 130 employs the shaker system 110 to shake the trunk of the tree at the shake point using the first arm and the second arm of the shaker system 110. To do so, the control system 130 employs the vibration generation system of the shaker system 110 to impart vibrational energy to the trunk of the tree at the shake point. The control system 130 may determine the characteristics of the vibrational energy (e.g., frequency, direction, amplitude, etc.) based on characteristics of the identified tree (e.g., species, thickness, etc.) and operational environment (e.g., temperature, weather, season, etc.).

Shaking the tree at the shake-point may also employ various sensors as a feedback system to appropriately shake the tree trunk. For example, the identification system 120 and other sensors may measure the position of the first arm and the second arm relative to the shake point to ensure that the arms remain appropriately positioned. Similarly, one or more sensors may measure the vibration energy being imparted to the tree by the first arm and the second arm, or one or more sensors may measure the state of the tree (e.g., cracking, splintering, etc.) to determine whether shaking the tree is damaging the tree.

Notably, in some configurations, while the control system 130 employs the shaker system 110 to shake the tree, the harvesting machine 100 continues navigating towards the next shake point on the path. In other words, the shaker system 110 shakes the tree as it is moving (rather than stopping to shake the tree). This allows the harvesting machine to increase the efficiency of harvesting fruit in the orchard.

In some configurations, the harvesting machine 100 includes a harvesting system. In this case, the control system 130 employs the harvesting system to harvest fruit shaken from the tree. Harvesting fruit from the tree may include, e.g., positioning the harvesting system below the fruit such that it falls into the harvesting system, and/or moving the harvesting system along the substrate.

The harvesting machine 100 may employ the workflow for each tree in the tree array. For instance, the harvesting machine 100 may capture an additional image, identify a shake point for the next tree in the tree array, position the harvesting machine 100 within a threshold distance from the next tree using the movement mechanisms, grip the next tree, and shake the next tree.

IV.B Identifying a Shake Point on a Tree Trunk

Figure 8:
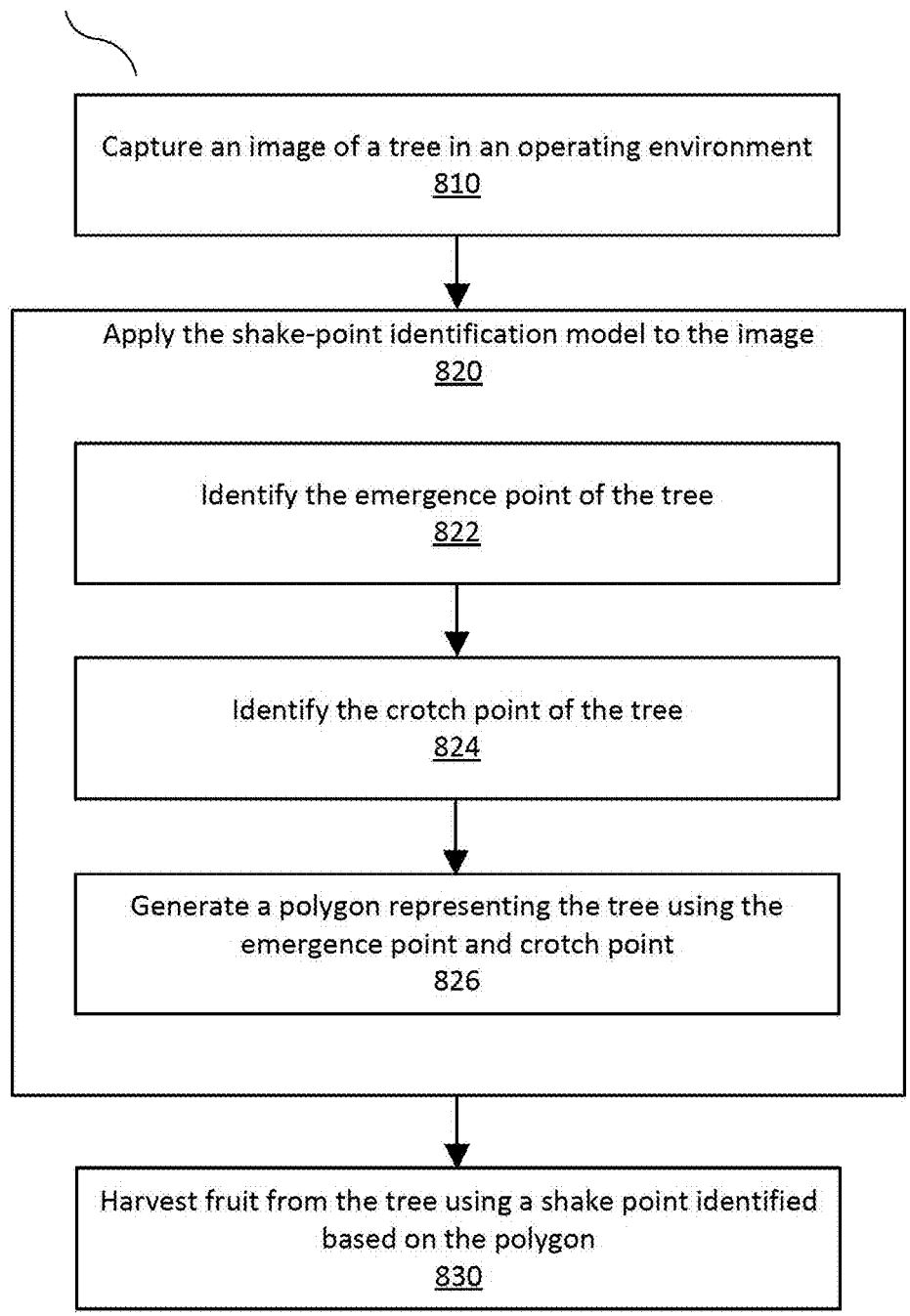
FIG. 8 shows a workflow diagram for a harvesting machine to identify a shake point of a tree, according to an example embodiment.

The harvesting machine 100 is configured to identify a shake point on a tree trunk using an image of the tree captured from the environment. To illustrate, FIG. 8 shows a workflow diagram for a harvesting machine to identify a shake point of a tree, according to an example embodiment. The workflow 800 may include additional or fewer steps, the steps may occur in a different order, and one or more of the steps may be repeated or omitted.

In this example, the harvesting machine 100 executes a harvesting plan to harvest cherries in a cherry orchard (e.g., the operating environment 200). As such, the tree array in the operating environment includes cherry trees spaced at regular intervals in tree rows. Each cherry tree has a trunk extending vertically from the substrate, one or more branches, one or more leaves, and fruits suspended in the canopy of the tree. The tree emerges from the substrate at an emergence point, and the trunk splits into two branches at the crotch point. The harvesting machine 100 includes a control system 130, an identification system 120, a shaker system, and a harvesting system. The control system 130 controls the identification system 120 to capture images of trees in the orchard, the shaker system 110 to grip and shake trees, and the harvesting system to harvest any cherries shaken from the tree. In the example workflow 800, the harvesting machine 100 is operating autonomously, and the sensor of the identification system 120 is a single camera system capturing a series of images. Notably, in some cases, the identification system 120 may include several camera systems capturing series of images, and the control system 130 is configured to aggregate and validate shake point position based on the analysis by multiple cameras.

The control system 130 instructs a sensor of the identification system 120 to capture 810 an image (or video) of a tree in the operating environment. The captured image comprises an array of pixels, and the array of pixels comprises information representing cherry trees in the orchard. That is, the latent information contained in the array of pixels (e.g., arrangement, RGB values, relative pixel values, etc.) represents the cherry tree and parts of the cherry tree. Thus, the latent information of the tree may represent, e.g., the trunk, the branches, the emergence point, the crotch point, leaves, fruit, etc. The captured image may also comprise information about other objects in the operating environment 200 (e.g., the harvesting machine 100, the substrate, additional trees, etc.).

The control system 130 employs the feature identification module 410 to identify the shake point of the tree. To do so, the feature identification module 410 applies 820 a feature identification model (e.g., the "shake-point identification model") to the accessed image. The feature identification model may be, e.g., a convolutional neural network (or some other classification model) configured to identify a shake point on the tree trunk using latent information included in the image.

The control system 130, using the feature identification model, identifies 822 the emergence point of the tree. That is, the control system 130 analyzes latent information included in the picture to determine which pixels represent the emergence point of the tree trunk in the image.

The control system 130, using the feature identification model, identifies 824 the crotch point of the tree trunk. The crotch point is located at the connection point between the tree trunk and a limb of one or more identified limbs of the tree. In other words, the crotch point is the point on the tree trunk closest to the ground where a branch separates from the trunk, or the trunk splits into two branches.

The control system 130, using the feature identification model, generates 826 a three-dimensional polygon enclosing the trunk. In an example configuration, the three-dimensional polygon extends from a bottom plane (or mesh) including an emergence point to a top plane (or mesh) including the shake point. The bottom and top planes are connected in a manner such that the generated three-dimensional polygon encloses the tree trunk. The generated polygon, therefore, may be a virtual representation of the tree trunk. The control system 130, using the feature identification model and other methods described herein, may determine coordinates for the generated three-dimensional polygon. The determined coordinates may be in a local reference frame relative to the harvesting machine 100 and/or a global reference frame.

The control system 130, using the feature identification model, identifies a shake point for the tree based on the generated three-dimensional polygon. The shake point may be, for example, below the top surface of the generated three-dimensional polygon, and above the bottom surface of the three-dimensional polygon. In some embodiments, the feature identification model may determine the shake point directly using an image of the tree (rather than generating a three-dimensional model). Additionally, the control system 130, using the feature identification model, may determine a corresponding harvesting position for the shake point that allows the harvesting machine 100 to harvest fruit from the tree when shaking the tree at the shake point.

The control system 130 controls the harvesting machine 100 to harvest 830 fruit from trees. To do so, the control system 130 uses the shaker system 110 to shake 830 the tree at the shake point. The shaker system 110 applies vibration energy to the tree which dislodges fruit from the tree. The control system 130 uses the harvesting system to harvest the cherries as they or dislodged from the tree, or after they are dislodged from the tree.

IV.C Generating a Representation of the Operating Environment

Figure 9:
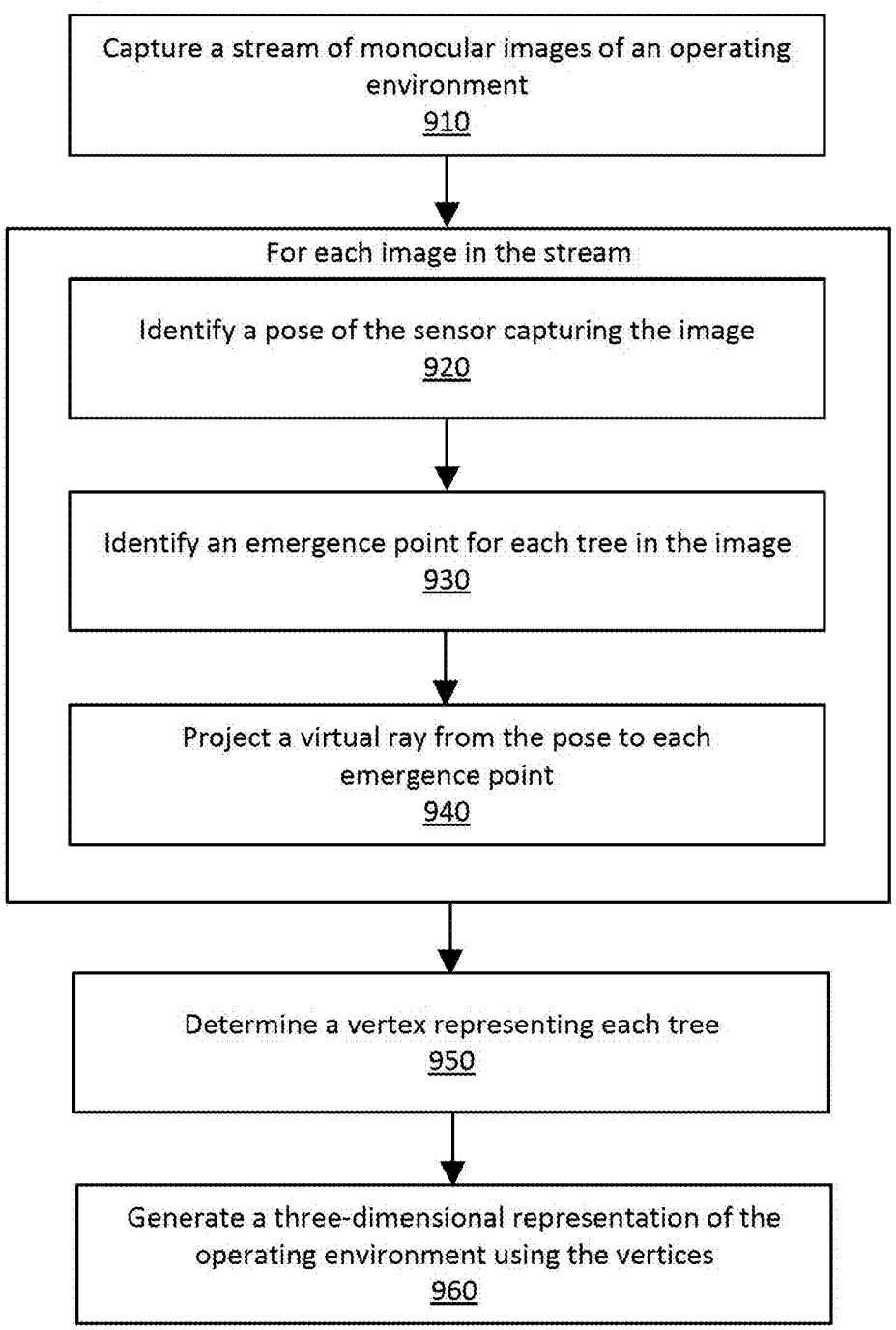
FIG. 9 shows a workflow diagram for a harvesting machine to generate a representation of an operating environment, according to an example embodiment.

The harvesting machine 100 is configured to generate a representation of the operating environment as the harvesting machine 100 travels through the environment. To illustrate, FIG. 9 shows a workflow diagram for a harvesting machine to generate a representation of an operating environment, according to an example embodiment. The workflow 900 may include additional or fewer steps, the steps may occur in a different order, and one or more of the steps may be repeated or omitted.

In this example, the harvesting machine 100 executes a harvesting plan to harvest walnuts in a walnut orchard (e.g., the operating environment). As such, the tree array in the operating environment includes walnut trees spaced at regular intervals in tree rows. Each walnut tree has a trunk extending vertically from the substrate, one or more branches, one or more leaves, and fruits suspended in the canopy of the tree. The tree emerges from the substrate at an emergence point. The harvesting machine 100 includes a control system 130, an identification system 120, and a shaker system 110. The control system 130 controls the identification system 120 to capture images of trees in the orchard, the shaker system 110 to grip and shake trees. In the example workflow 900, the harvesting machine 100 is operating autonomously, and the sensor of the identification system 120 is a single camera system capturing a series of images.

The control system 130 instructs a sensor of the identification system 120 to capture 910 a stream of images (e.g., a video) of trees in the environment as the harvesting machine 100 travels through the environment performing harvesting actions of the harvesting plan. Each captured image in the stream comprises an array of pixels, and the array of pixels comprises information representing walnut trees in the orchard. That is, the latent information contained in the array of pixels (e.g., arrangement, RGB values, relative pixel values, etc.) represents walnut trees and parts of the walnut trees. Thus, the latent information may represent, e.g., trunks, branches, emergence points, crotch points, leaves, fruit, etc. Captured images in the stream may also include information about other objects in the operating environment (e.g., the harvesting machine 100, the substrate, additional trees, etc.). In some examples, the control system 130 may generate a feature stream describing identified features, and a pose stream describing determined poses based on the image stream (as described above).

The control system 130 identifies 920 a pose of the sensor of the identification system 120 which captures the image for each image in the image stream. The control system 130 may access information from one or more of, e.g., an inertial measurement unit, a gyroscope, an accelerometer, a wheel encoder, etc. to determine the pose of the sensor. For example, the control system 130 may access three-dimensional coordinates and orientation of the sensor from an inertial measurement system of the component array via the network. In an example, the three-dimensional coordinates may be in the local reference frame of the harvesting machine 100 (e.g., when the harvesting machine 100 does not have access to a global reference frame). In an example, the three-dimensional coordinates may be in the global reference frame (e.g., when the harvesting machine 100 has access to the global reference frame). In an example configuration, the localization model may access determined poses from the pose stream rather than determining them locally.

The control system 130 identifies each tree in the image for each image in the image stream. For example, the control system 130 may access or receive information from the feature identification model including which pixels in the image represent trees. Moreover, the accessed or received information may indicate which part of the tree is represented by various pixels (e.g., an emergence point, a shake point, etc.). In some configurations, the accessed or received information may be in the form of a polygon representing the tree.

The control system 130 identifies 930 the emergence point for each tree in the image for each image in the image stream. The control system may access the emergence points (e.g., from a data store or from the feature identification model), receive the emergence points (e.g., from the shake point identification model), e.g., or determine the emergence points (e.g., based on a polygon representing the trees). In other words, in some configurations, the localization model may access determined features from the feature stream.

The control system 130 projects 940 a virtual ray from the identification system 120 to each tree identified in the image, for each image in the image stream. To do so, the localization model, for example, projects the virtual ray from the position of the sensor of the identification system 120 capturing the image through the emergence point of the tree (although it could be some other identified feature as disclosed hereinabove). The projection is made using a position of the identification system 120 determined from, e.g., the determined pose of the identification system 120.

The control system 130 determines 950 a vertex representing each tree in the image. The vertex for a tree is a point in space indicated by the confluence of virtual rays intersecting the emergence point of that tree across images in the image stream. That is, as the harvesting machine 100 moves through the operating environment 200 obtaining images, the virtual rays projecting from the identification system 120 to the emergence point for each tree change (because the position of the tree in the image changes). However, because the virtual ray for each tree always terminates at the emergence point (because the position of the tree is stationary in space), those virtual rays can be said to indicate the vertex for the tree.

The control system 130 generates 960 a three-dimensional representation of the environment 200 using the vertices representing the trees. To do so, the control system 130 may access, e.g., various measurements of the harvesting machine 100 which allow the harvesting machine 100 to triangulate the vertex of each tree in the local reference from of the harvesting machine 100 (as described above).

The control system 130 may employ the shaker system 110 and/or the harvesting system to harvest fruit from trees in the operating environment based on the generated three-dimensional representation of the environment. For example, the control system 130 may navigate to a tree, shake the tree, and harvest the dislodged fruit based on the three-dimensional representation of the environment.

IV.D Determining a Route Through an Operating Environment

Figure 10:
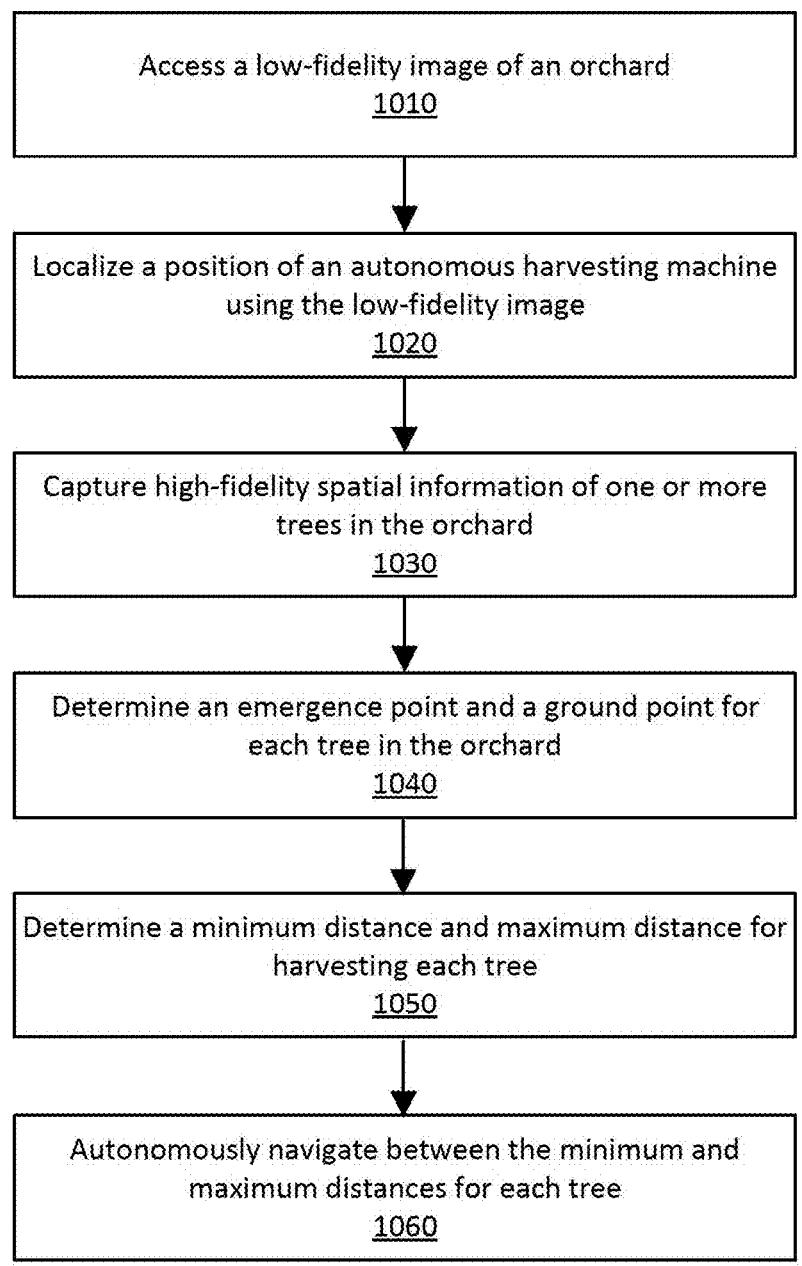
FIG. 10 shows a workflow diagram for determining a route through the operating environment, according to an example embodiment.

The harvesting machine 100 is configured to determine a route through an operating environment to harvest fruit from trees. To illustrate, FIG. 10 shows a workflow diagram for determining a route through the operating environment, according to an example embodiment. The workflow 1000 may include additional or fewer steps, the steps may occur in a different order, and one or more of the steps may be repeated or omitted.

In this example, the harvesting machine 100 executes a harvesting plan to autonomously harvest peaches in a peach orchard. As such, the tree array in the operating environment includes peach trees spaced at approximately regular intervals in tree rows. However, as in most orchards, there is some variation in the spacing between peach trees in the orchard. That is, for example, one or more trees may be, e.g., six inches from a position that would create a perfectly spaced tree array. Additionally, as described above, the shaker system 110 has a minimum and a maximum for its various degrees of freedom (e.g., a minimum distance the clamping assembly can be spaced from the chassis of the harvesting machine 100, and a maximum distance the clamping assembly can be spaced from the chassis of the harvesting machine 100).

Therefore, due to the variable position of trees and the constraints to shaker system 110 movement, the harvesting machine 100 may not be able to travel a straight route through the orchard without being positioned less than the minimum distance from a tree, or more than the maximum distance from a tree. A control system 130 of the harvesting machine 100 generates a route through the orchard that accounts for the variability in tree spacing in the tree array in view of the machine constraints of the harvesting machine 100. The harvesting machine 100 also includes an identification system 120, a shaker system 110, and a harvesting system.

To generate the route, the control system 130 of the harvesting machine 100 accesses 1010 a low-fidelity image of an orchard (e.g., a tree array) including one or more tree rows. As described above, the tree rows are spaced such that there is a regular periodicity between trees in the orchard, but there is some variation in tree position in the tree array. In this example, the low-fidelity image is a satellite image, but could be some other low-fidelity image as described herein.

The control system 130 of the harvesting machine 100 localizes 1020 a position of the harvesting machine 100 in a tree row in the orchard. To do so, the harvesting machine 100 may access or determine the position information of each tree as indicated by the low-fidelity image and compare that information to the position of the harvesting machine 100. However, because the position of trees in the orchard is based on a low-fidelity image, there may be some error in the position information, and, as such, the harvesting machine 100 leverages higher fidelity data to generate a harvesting route. In some cases, the control system 130 may localize the position of the harvesting machine along the initial route through the orchard generated based on the low-fidelity image.

The control system 130 captures 1030 high-resolution spatial information of the trees in the orchard. For instance, the control system 130 may access the three-dimensional representations of trees in the orchard determined by the feature identification module 410 and feature localization module 430. Alternatively, or additionally, the control system 130 may access, with the system environment, a data structure including high-resolution positional information of trees in the orchard.

The control system 130 determines 1040 an emergence point and a shake point for each tree in the orchard using the high-resolution spatial information. For instance, the three-dimensional representations include the position information for various parts of the tree including the ground point and the shake point of each tree in the row. As such, the control system 130 may determine those points using the three-dimensional representations of the trees.

The control system 130 determines 1050 a minimum distance and a maximum distance from the tree based on the ground point and the shake point for the tree. More explicitly, the control system 130 accesses the machine constraints of the shaker system 110 and compares the machine constraints to the current position of the harvesting machine 100. The control system 130 then determines a route (or modifies the initial route) that enables the harvesting machine 100 to travel from tree to tree while staying between the minimum distance and the maximum distance of the shaker system 110.

The control system 130 generates 1060 instructions that cause the harvesting machine 100 to autonomously navigate 1060 the route. In other words, the control system 130 causes the harvesting machine 100 to move along trees in the tree row between the minimum distance and the maximum distance for each tree in the tree row. As the harvesting machine 100 navigates the route, the harvesting machine harvests fruit from trees.

V. Additional Configurations

The systems and methods herein are described as being implemented by an autonomous harvesting machine. However, many of the methods may be implemented by a machine or system that identifies and localizes features from images. For example, the methods described herein for localizing features may be employed by e.g., an automobile, an automated harvester, a construction machine, etc. Additionally, the description describes the system herein as a harvesting machine, however, the harvesting machine is more generally an agricultural machine configured to perform the various methodologies described herein.

VI. Control System

Figure 11:
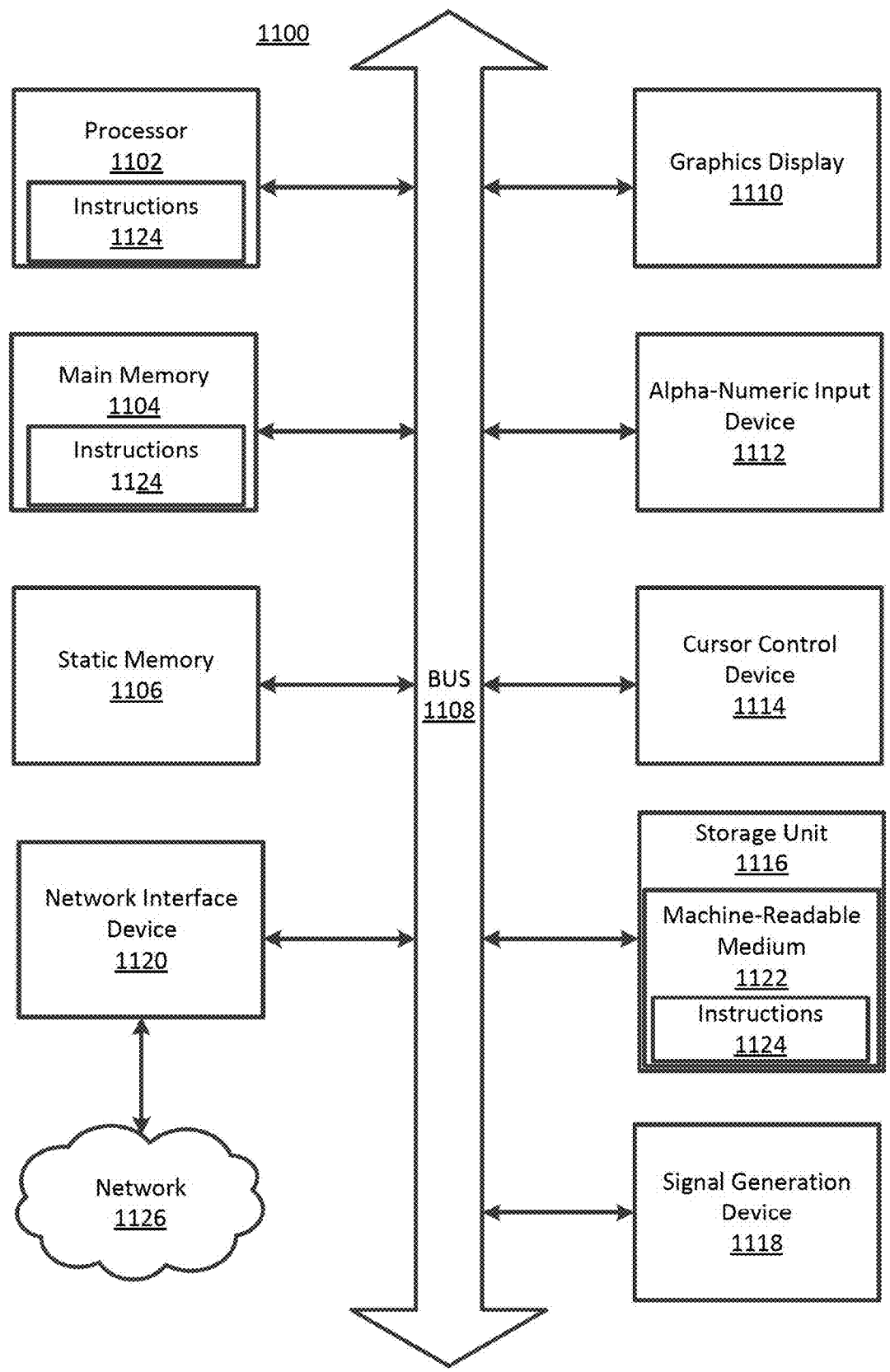
FIG. 11 is a block diagram illustrating components of an example machine for reading and executing instructions from a machine-readable medium, according to an example embodiment.

FIG. 11 is a block diagram illustrating components of an example machine for reading and executing instructions from a machine-readable medium. Specifically, FIG. 8 shows a diagrammatic representation of control system 130 in the example form of a computer system 1100. The computer system 1100 can be used to execute instructions 1124 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 1124 (sequential or otherwise) that specify actions to be taken by that machine. Further, while only a single machine is illustrated, the term "machine" shall also be taken to include any collection of machines that individually or jointly execute instructions 1124 to perform any one or more of the methodologies discussed herein.

The example computer system 1100 includes one or more processing units (generally processor 1102). The processor 1102 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 1100 also includes a main memory 1104. The computer system may include a storage unit 1116. The processor 1102, memory 1104, and the storage unit 1116 communicate via a bus 1108.

In addition, the computer system 1100 can include a static memory 1106, a graphics display 1110 (e.g., to drive a plasma display panel (PDP), a liquid crystal display (LCD), or a projector). The computer system 1100 may also include alphanumeric input device 1112 (e.g., a keyboard), a cursor control device 55 (e.g., a mouse, a trackball, a joystick, a motion sensor, or other pointing instrument), a signal generation device 1118 (e.g., a speaker), and a network interface device 1120, which also are configured to communicate via the bus 1108.

The storage unit 1116 includes a machine-readable medium 1122 on which is stored instructions 1124 (e.g., software) embodying any one or more of the methodologies or functions described herein. For example, the instructions 1124 may include the functionalities of modules of the system 130 described in FIG. 2. The instructions 1124 may also reside, completely or at least partially, within the main memory 1104 or within the processor 1102 (e.g., within a processor's cache memory) during execution thereof by the computer system 1100, the main memory 1104 and the processor 1102 also constituting machine-readable media. The instructions 1124 may be transmitted or received over a network 1126 (e.g., network 220) via the network interface device 1120.

VII. Additional Considerations

The description above refers to various modules and models capable of performing various algorithms and calculating various characteristics. Notably, the various models may take any number of forms. For instance, a single model can both identify plants in an image and calculate performance characteristics (e.g., using a single encoder and two decoders). Alternatively, or additionally, a first model can identify plants and a second model can calculate performance characteristics (e.g., a first encoder and decoder, and a second encoder and decoder). Alternatively, or additionally, each model is capable of modifying itself or another model according to the principles described hereinabove. For instance, a first result of a first model can modify a second model, or a model may modify itself based on its own results.

In the description above, for purposes of explanation, numerous specific details are set forth in order to provide a thorough understanding of the illustrated system and its operations. It will be apparent, however, to one skilled in the art that the system can be operated without these specific details. In other instances, structures and devices are shown in block diagram form in order to avoid obscuring the system.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Some portions of the detailed descriptions are presented in terms of algorithms or models and symbolic representations of operations on data bits within a computer memory. An algorithm is here, and generally, conceived to be steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some of the operations described herein are performed by a computer physically mounted within a machine. This computer may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMS, EEPROMs, magnetic or optical cards, or any type of non-transitory computer readable storage medium suitable for storing electronic instructions.

The figures and the description above relate to various embodiments by way of illustration only. It should be noted that from the following discussion, alternative embodiments of the structures and methods disclosed herein will be readily recognized as viable alternatives that may be employed without departing from the principles of what is claimed.

One or more embodiments have been described above, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct physical or electrical contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present), and B is false (or not present), A is false (or not present), and B is true (or present), and both A and B is true (or present).

In addition, use of the "a" or "an" are employed to describe elements and components of the embodiments herein. This is done merely for convenience and to give a general sense of the system. This description should be read to include one or at least one and the singular also includes the plural unless it is obvious that it is meant otherwise.

Upon reading this disclosure, those of skill in the art will appreciate still additional alternative structural and functional designs for a system and a process for identifying and treating plants with a farming machine including a control system executing a semantic segmentation model. Thus, while particular embodiments and applications have been illustrated and described, it is to be understood that the disclosed embodiments are not limited to the precise construction and components disclosed herein. Various modifications, changes and variations, which will be apparent to those, skilled in the art, may be made in the arrangement, operation and details of the method and apparatus disclosed herein without departing from the spirit and scope defined in the appended claims.

What is claimed is:

1. A method comprising:
   accessing a low-fidelity image of an orchard comprising one or more tree rows;
   localizing, using the low-fidelity image, a position of an autonomous agricultural machine in a tree row of the one or more tree rows in the orchard;
   capturing, using the autonomous agricultural machine, high-resolution spatial information of one or more trees in the tree row;
   determining, for each tree in the tree row, an emergence point and a shake point of the tree using the high-resolution spatial information;
   determining, for each tree in the tree row, a corresponding minimum distance and maximum distance from the tree based on the emergence point and the shake point for the tree; and
   autonomously navigating the autonomous agricultural machine such that the autonomous agricultural machine moves along the tree row between the minimum distance and the maximum distance for each tree in the tree row.

2. The method of claim 1, wherein the low-fidelity image is a satellite image captured of the orchard.

3. The method of claim 1, wherein capturing high-resolution spatial information of one or more trees in the tree row comprises triangulating positions of features in the orchard using a stream of monocular images of the orchard captured by the autonomous agricultural machine.

4. The method of claim 1, further comprising:
   generating an initial route through the orchard using the low-fidelity image; and
   modifying the initial route to a modified route using the high-resolution spatial information.

5. The method of claim 4, wherein the modified route is configured to allow the autonomous agricultural machine to move along the tree row between the minimum distance and the maximum distance for each tree in the tree row.

6. The method of claim 1, wherein a position of the emergence point and the shake point of each tree is determined in a local reference frame of the autonomous agricultural machine.

7. The method of claim 6, wherein the position of the emergence point and the shake point of each tree is updated using a global reference frame when the autonomous agricultural machine accesses the global reference frame.

8. The method of claim 1, further comprising optimizing a path along the tree row to reduce a lateral movement of the autonomous agricultural machine.

9. A non-transitory computer-readable storage medium storing computer program instructions, the computer program instructions, when executed by one or more processors, causing the one or more processors to:
   access a low-fidelity image of an orchard comprising one or more tree rows;
   localize, using the low-fidelity image, a position of an autonomous agricultural machine in a tree row of the one or more tree rows in the orchard;
   capture, using the autonomous agricultural machine, high-resolution spatial information of one or more trees in the tree row;
   determine, for each tree in the tree row, an emergence point and a shake point of the tree using the high-resolution spatial information;
   determine, for each tree in the tree row, a corresponding minimum distance and maximum distance from the tree based on the emergence point and the shake point for the tree; and
   autonomously navigate the autonomous agricultural machine such that the autonomous agricultural machine moves along the tree row between the minimum distance and the maximum distance for each tree in the tree row.

10. The non-transitory computer-readable storage medium of claim 9, wherein the low-fidelity image is a satellite image captured of the orchard.

11. The non-transitory computer-readable storage medium of claim 9, wherein capturing high-resolution spatial information of one or more trees in the tree row further causes the computer program instructions, when executed by the one or more processors, to triangulate positions of features in the orchard using a stream of monocular images of the orchard captured by the autonomous agricultural machine.

12. The non-transitory computer-readable storage medium of claim 9, wherein the computer program instructions, when executed, cause the one or more processors to:
   generate an initial route through the orchard using the low-fidelity image; and
   modify the initial route to a modified route using the high-resolution spatial information.

13. The non-transitory computer-readable storage medium of claim 12, wherein the modified route is configured to allow the autonomous agricultural machine to move along the tree row between the minimum distance and the maximum distance for each tree in the tree row.

14. The non-transitory computer-readable storage medium of claim 9, wherein a position of the emergence point and the shake point of each tree is determined in a local reference frame of the autonomous agricultural machine.

15. The non-transitory computer-readable storage medium of claim 14, wherein the position of the emergence point and the shake point of each tree is updated using a global reference frame when the autonomous agricultural machine accesses the global reference frame.

16. The non-transitory computer-readable storage medium of claim 9, wherein the computer program instructions, when executed, cause the one or more processors to optimize a path along the tree row to reduce a lateral movement of the autonomous agricultural machine.

17. An autonomous agricultural machine comprising:
an identification system configured to capture high-resolution spatial information of one or more trees in tree rows;
a chassis comprising one or more transport systems; and
a control system comprising one or more processors, the one or more processors configured to execute computer program instructions that, when executed by the one or more processors, cause the control system to:
  access a low-fidelity image of an orchard comprising one or more tree rows;
  localize, using the low-fidelity image, a position of an autonomous agricultural machine in a tree row of the one or more tree rows in the orchard;
  capture, using the identification system of the autonomous agricultural machine, high-resolution spatial information of one or more trees in the tree row;
  determine, for each tree in the tree row, an emergence point and a shake point of the tree using the high-resolution spatial information;
  determine, for each tree in the tree row, a corresponding minimum distance and maximum distance from the tree based on the emergence point and the shake point for the tree; and
  autonomously navigate the autonomous agricultural machine, using the one or more transport systems, such that the autonomous agricultural machine moves along the tree row between the minimum distance and the maximum distance for each tree in the tree row.

18. The autonomous agricultural machine of claim 17, wherein the low-fidelity image is a satellite image captured of the orchard.

19. The autonomous agricultural machine of claim 17, wherein capturing high-resolution spatial information of one or more trees in the tree row further causes the computer program instructions, when executed by the one or more processors, to triangulate positions of features in the orchard using a stream of monocular images of the orchard captured by the autonomous agricultural machine.

20. The autonomous agricultural machine of claim 17, wherein the computer program instructions, when executed, cause the one or more processors to:
generate an initial route through the orchard using the low-fidelity image; and
modify the initial route to a modified route using the high-resolution spatial information.

* * * * *